US012762987B2

(12) United States Patent
An et al.

(10) Patent No.: US 12,762,987 B2
(45) Date of Patent: Oct. 13, 2026

(54) DISPLAY DEVICE AND METHOD OF DRIVING THE SAME, AND ELECTRONIC DEVICE INCLUDING THE DISPLAY DEVICE

(71) Applicant: Samsung Display Co., LTD., Yongin-si (KR)

(72) Inventors: Jung Eon An, Yongin-si (KR); Ki Hyun Pyun, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/790,466

(22) Filed: Jul. 31, 2024

(65) Prior Publication Data

US 2025/0191515 A1 Jun. 12, 2025

(30) Foreign Application Priority Data

Dec. 6, 2023 (KR) ........................ 10-2023-0175376

(51) Int. Cl.
*G09G 3/20* (2006.01)
*G09G 3/00* (2006.01)
*G09G 3/3233* (2016.01)

(52) U.S. Cl.
CPC ........... *G09G 3/2092* (2013.01); *G09G 3/006* (2013.01); *G09G 3/2007* (2013.01);
(Continued)

(58) Field of Classification Search
CPC .... G09G 3/2092; G09G 3/006; G09G 3/2007; G09G 3/3233; G09G 2300/0819;
(Continued)

(56) References Cited

U.S. PATENT DOCUMENTS 9,747,861 B2 * 8/2017 Nam .................... G09G 3/3696
10,354,586 B2 * 7/2019 Maeyama ............ G09G 3/3233
(Continued)

FOREIGN PATENT DOCUMENTS

KR 10-2011-0066446 A 6/2011
KR 10-2281008 B1 4/2016
(Continued)

OTHER PUBLICATIONS

International Search Report Jan. 22, 2025, issued International Patent Application PCT/KR2024/015976, 3 pages.

*Primary Examiner* — Jose R Soto Lopez
(74) *Attorney, Agent, or Firm* — Womble Bond Dickinson (US) LLP

(57) ABSTRACT

A display device includes: a pixel component including pixels connected to a first power line, a second power line, scan lines, and data lines; a sensing resistor between the first power line and the pixel component; a voltage/current sensing component configured to measure a sensing voltage from the sensing resistor during a correction period; a timing controller configured to generate a voltage code based on pieces of input data; and a power generator configured to supply a voltage of first driving power to the first power line in response to the voltage code, wherein the timing controller is configured to generate, during the correction period, a compensation look-up table (LUT) such that a target voltage corresponding to the voltage code matches with the sensing voltage.

24 Claims, 14 Drawing Sheets

(52) U.S. Cl.
CPC ... *G09G 3/3233* (2013.01); *G09G 2300/0819* (2013.01); *G09G 2300/0842* (2013.01); *G09G 2330/021* (2013.01); *G09G 2330/028* (2013.01)

(58) Field of Classification Search
CPC ..... G09G 2300/0842; G09G 2330/021; G09G 2330/028; G09G 3/20; G09G 2310/08; G09G 2320/0271; G09G 2320/0285
See application file for complete search history.

(56) References Cited

U.S. PATENT DOCUMENTS

| | | | | |
|---|---|---|---|---|
| 10,720,088 | B1 * | 7/2020 | Li | G09G 3/2007 |
| 11,605,331 | B2 | 3/2023 | Pyun et al. | |
| 11,670,234 | B2 * | 6/2023 | Lee | G09G 3/3233 345/94 |
| 11,790,849 | B2 | 10/2023 | Pyun et al. | |
| 11,871,642 | B2 * | 1/2024 | Park | H10K 59/60 |
| 2010/0171733 | A1 * | 7/2010 | Kobayashi | G09G 3/3208 345/211 |
| 2011/0141097 | A1 * | 6/2011 | Lee | G09G 3/3208 345/212 |
| 2016/0140894 | A1 * | 5/2016 | Eun | H04N 13/356 345/212 |
| 2016/0180771 | A1 * | 6/2016 | Jeong | G09G 3/3258 345/82 |
| 2016/0293101 | A1 * | 10/2016 | Jeong | G09G 3/3258 |
| 2017/0053587 | A1 * | 2/2017 | Kim | G09G 3/2092 |
| 2019/0164484 | A1 * | 5/2019 | Yeo | G09G 3/3291 |
| 2020/0152121 | A1 * | 5/2020 | Sung | G09G 3/3225 |
| 2020/0251045 | A1 * | 8/2020 | An | G09G 3/32 |
| 2021/0201781 | A1 * | 7/2021 | Kim | G09G 3/3233 |
| 2021/0256904 | A1 * | 8/2021 | Kang | G09G 3/3225 |
| 2022/0157225 | A1 * | 5/2022 | Choi | G09G 3/32 |
| 2022/0215803 | A1 * | 7/2022 | Pyun | G09G 3/3258 |
| 2022/0254300 | A1 * | 8/2022 | Pyun | G09G 3/3233 |
| 2022/0277687 | A1 * | 9/2022 | Pyun | G09G 3/2007 |
| 2022/0309985 | A1 * | 9/2022 | Pyun | G09G 3/2007 |
| 2023/0186831 | A1 * | 6/2023 | Pyun | G09G 3/32 345/55 |
| 2023/0274686 | A1 * | 8/2023 | Pyun | G09G 3/2007 |
| 2023/0410714 | A1 * | 12/2023 | Pyun | G09G 3/2096 |

FOREIGN PATENT DOCUMENTS

| | | | |
|---|---|---|---|
| KR | 10-2020-0030222 | A | 3/2020 |
| KR | 10-2203522 | B1 | 1/2021 |
| KR | 10-2022-0087882 | A | 6/2022 |
| KR | 10-2022-0099169 | A | 7/2022 |
| KR | 10-2022-0134806 | A | 10/2022 |
| KR | 10-2023-0090417 | A | 6/2023 |

* cited by examiner

| | BEFORE COMPENSATION | | | | AFTER COMPENSATION | | | | |
|---|---|---|---|---|---|---|---|---|---|
| | Vcode | TARGET VOLTAGE | SV | VOLTAGE DIFFERENCE | Offset | Vcode | TARGET VOLTAGE | SV | VOLTAGE DIFFERENCE |
| FIRST GRAYSCALE VALUE | 40 | 13.5V | 14.1V | −0.6V | −10 | 30 | 13.5V | 13.5V | 0V |
| SECOND GRAYSCALE VALUE | 128 | 19.0V | 20.2V | −1.2V | −20 | 108 | 19.0V | 19.0V | 0V |
| THIRD GRAYSCALE VALUE | 220 | 24.8V | 26.6V | −1.8V | −30 | 190 | 24.8V | 24.8V | 0V |

| | BEFORE COMPENSATION | | | | AFTER COMPENSATION | | | | |
|---|---|---|---|---|---|---|---|---|---|
| | Vcode | TARGET VOLTAGE | SV | VOLTAGE DIFFERENCE | Offset | Vcode | TARGET VOLTAGE | SV | VOLTAGE DIFFERENCE |
| FIRST GRAYSCALE VALUE | 40 | 13.5V | 12.9V | +0.6V | +10 | 50 | 13.5V | 13.5V | 0V |
| SECOND GRAYSCALE VALUE | 128 | 19.0V | 17.8V | +1.2V | +20 | 148 | 19.0V | 19.0V | 0V |
| THIRD GRAYSCALE VALUE | 220 | 24.8V | 23V | +1.8V | +30 | 250 | 24.8V | 24.8V | 0V |

| | BEFORE COMPENSATION | | | | AFTER COMPENSATION | | | | |
|---|---|---|---|---|---|---|---|---|---|
| | Vcode | TARGET VOLTAGE | SV | VOLTAGE DIFFERENCE | Offset | Vcode | TARGET VOLTAGE | SV | VOLTAGE DIFFERENCE |
| FIRST GRAYSCALE VALUE | 40 | 13.5V | 13.5V | 0V | 0 | 40 | 13.5V | 13.5V | 0V |
| SECOND GRAYSCALE VALUE | 128 | 19.0V | 19.0V | 0V | 0 | 128 | 19.0V | 19.0V | 0V |
| THIRD GRAYSCALE VALUE | 220 | 24.8V | 24.8V | 0V | 0 | 220 | 24.8V | 24.8V | 0V |

DISPLAY DEVICE AND METHOD OF DRIVING THE SAME, AND ELECTRONIC DEVICE INCLUDING THE DISPLAY DEVICE

CROSS-REFERENCE TO RELATED APPLICATION

The present application claims priority to and the benefit of Korean Patent Application Number 10-2023-0175376, filed on Dec. 6, 2023, in the Korean Intellectual Property Office, the entire disclosure of which is incorporated herein by reference.

BACKGROUND

1. Field

Aspects of some embodiments of the present disclosure relate to a display device, a method of driving the display device, and an electronic device including the display device.

2. Description of Related Art

With the development of information technology, the importance of a display device, which provides a connection medium between a user and information, has been emphasized. Owing to the importance of display devices, the use of various kinds of display devices, such as liquid crystal display devices and organic light-emitting display devices, has increased.

A display device may use a plurality of pixels to display images. The pixels may generate light having a certain luminance while controlling the amount of current flowing from a first driving power supply to a second driving power supply.

To minimize or reduce power consumption, the voltage of the first driving power supply may be changed in response to the load of a pixel component including pixels. To enable the pixels to display images having a desired luminance, the first driving power supply may desirably maintain a target voltage (or a set voltage, or a target voltage).

The above information disclosed in this Background section is only for enhancement of understanding of the background and therefore the information discussed in this Background section does not necessarily constitute prior art.

SUMMARY

Aspects of some embodiments of the present disclosure include a display device, a method of driving the display device, and an electronic device including the display device, in which first driving power may be maintained at a target voltage regardless of the tolerance of circuits for generating the power.

According to some embodiments of the present disclosure, a display device includes: a pixel component including pixels connected to a first power line, a second power line, scan lines, and data lines; a sensing resistor positioned between the first power line and the pixel component; a voltage/current sensing component configured to measure a sensing voltage from the sensing resistor during a correction period; a timing controller configured to generate a voltage code based on pieces of input data; and a power generator configured to supply a voltage of first driving power to the first power line in response to the voltage code. According to some embodiments, the timing controller may generate, during the correction period, a compensation look-up table (LUT) such that a target voltage corresponding to the voltage code matches with the sensing voltage.

According to some embodiments, the timing controller may generate the compensation LUT in response to a first voltage code of a minimum load, a second voltage code of an intermediate load, and a third voltage code of a maximum load.

According to some embodiments, the timing controller may generate the compensation LUT corresponding to remaining loads and remaining voltage codes by interpolating the first voltage code, the second voltage code, and the third voltage code.

According to some embodiments, the first voltage code may correspond to a minimum grayscale value, the second voltage code may correspond to an intermediate grayscale value, and the third voltage code may correspond to a maximum grayscale value.

According to some embodiments, the correction period is positioned at a time point at which power is supplied to the display device, or at a time point at which power is supplied to the display device after a usage time of the display device exceeds a preset threshold value.

According to some embodiments, the voltage/current sensing component measures sensing current from the sensing resistor during a period other than the correction period.

According to some embodiments, the power generator may include: an analog-digital converter configured to generate a reference voltage using the voltage code; and a DC-DC converter configured to generate the first driving power based on the reference voltage.

According to some embodiments, the timing controller may include: an analyzer configured to calculate a load from the pieces of input data, and extract a peak grayscale value; a code value generator configured to generate the voltage code corresponding to the load and the peak grayscale value; and a voltage adjuster configured to generate the compensation LUT using an offset corresponding to a difference between the sensing voltage and the target voltage.

According to some embodiments, the timing controller may further include a sensing controller configured to control the voltage/current sensing component to measure the sensing voltage during the correction period, and control the voltage/current sensing component to measure sensing current during a period other than the correction period.

According to some embodiments, the analyzer may include: a load analyzer configured to calculate a load from the pieces of input data; and a grayscale analyzer configured to extract the peak grayscale value from the pieces of input data.

According to some embodiments, the voltage adjuster may include: a voltage error determination component configured to extract a target voltage corresponding to the voltage code from a target LUT, and generate an offset corresponding to a difference between the sensing voltage and the target voltage; and a compensation LUT generator configured to generate the compensation LUT by applying the offset to a reference LUT in which the target voltage corresponding to the voltage code is stored.

According to some embodiments, the target LUT may be an LUT identical to the reference LUT.

According to some embodiments, the voltage error determination component may generate an offset of a negative value in a case where the sensing voltage is higher than the target voltage, and generate an offset of a positive value in a case where the sensing voltage is lower than the target voltage.

According to some embodiments, the voltage error determination component may generate a value of "0" as the offset in a case where the sensing voltage is identical to the target voltage.

According to some embodiments, the code value generator may generate the voltage code using the compensation LUT during a period other than the correction period.

According to some embodiments of the present disclosure in a method of driving a display device, the method includes: generating a voltage of first driving power corresponding to a voltage code during a correction period; measuring the voltage of the first driving power and generating a sensing voltage; comparing the sensing voltage with a target voltage corresponding to the voltage code, and generating an offset; and generating a compensation look-up table (LUT) using the offset.

According to some embodiments, the offset may be generated such that the sensing voltage is identical to the target voltage.

According to some embodiments, the voltage code may be generated using the compensation LUT during a period other than the correction period.

According to some embodiments, generating the compensation LUT may include generating the compensation LUT in response to a first voltage code of a minimum load, a second voltage code of an intermediate load, and a third voltage code of a maximum load during the correction period.

According to some embodiments, the method may further include generating the compensation LUT corresponding to remaining loads and remaining codes by interpolating the first voltage code, the second voltage code, and the third voltage code.

According to some embodiments, the first voltage code may correspond to a minimum grayscale value, the second voltage code may correspond to an intermediate grayscale value, and the third voltage code may correspond to a maximum grayscale value.

According to some embodiments, the correction period may be positioned at a time point at which power is supplied to the display device, or at a time point at which power is supplied to the display device after a usage time of the display device exceeds a preset threshold value.

According to some embodiments, generating the offset may include generating an offset of a negative value in a case where the sensing voltage is higher than the target voltage, and generating an offset of a positive value in a case where the sensing voltage is lower than the target voltage.

According to some embodiments of the present disclosure, an electronic device includes: a display panel including pixels; a voltage generation circuit configured to supply a voltage of first driving power to the display panel based on a voltage code; a current/voltage sensing component configured to measure, during a correction period, the voltage of the first driving power supplied to the display panel and generate a sensing voltage; and a controller configured to generate the voltage code based on pieces of input data. The controller may generate, during the correction period, a compensation LUT such that a target voltage corresponding to the voltage code matches with the sensing voltage.

According to some embodiments, the controller may generate the compensation LUT in response to a first voltage code of a minimum load, a second voltage code of an intermediate load, and a third voltage code of a maximum load. The controller may generate the compensation LUT corresponding to remaining loads and remaining voltage codes by interpolating the first voltage code, the second voltage code, and the third voltage code.

According to some embodiments, the controller may generate the voltage code using the compensation LUT during a period other than the correction period.

The characteristics of embodiments according to the present disclosure are not limited to the above-stated characteristics, and those skilled in the art will clearly understand other not mentioned characteristics from the accompanying claims.

DETAILED DESCRIPTION

Figure 1:
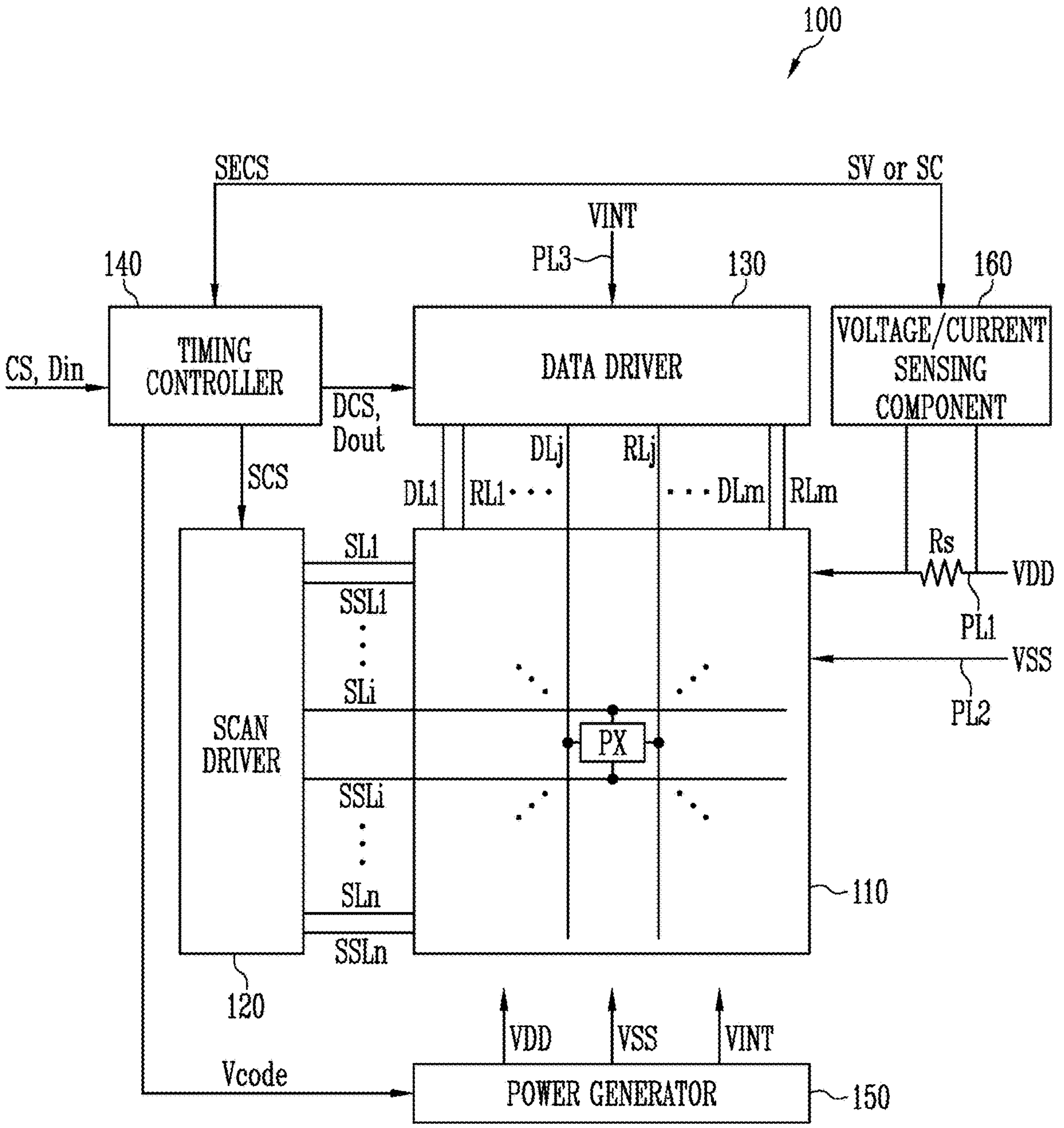
FIG. 1 is a diagram illustrating a display device according to some embodiments of the present disclosure.

Hereinafter, aspects of some embodiments of the present invention will be described in more detail with reference to the attached drawings, such that those skilled in the art can easily implement the present invention. The present disclosure may be implemented in various forms, and is not limited to the embodiments to be described herein below.

In the drawings, portions which are not related to the present disclosure will be omitted in order to explain the present disclosure more clearly. Reference should be made to the drawings, in which similar reference numerals are used throughout the different drawings to designate similar components. Therefore, the aforementioned reference numerals may be used in other drawings.

For reference, the size of each component and the thicknesses of lines illustrating the component are arbitrarily represented for the sake of explanation, and the present disclosure is not limited to what is illustrated in the drawings. In the drawings, the thicknesses of the components may be exaggerated to clearly depict multiple layers and areas.

Furthermore, the expression "being the same" may mean "being substantially the same". In other words, the expression "being the same" may include a range that can be tolerated by those skilled in the art. The other expressions may also be expressions from which the term "substantially" has been omitted.

Some embodiments are described in the accompanying drawings in connection with functional blocks, units and/or modules. Those skilled in the art will understand that such blocks, units, and/or modules are physically implemented by logic circuits, discrete components, microprocessors, hardwired circuits, memory elements, line connections, and other electronic circuits. This may be formed using semiconductor-based fabrication techniques or other fabrication techniques. For blocks, units, and/or modules implemented by a microprocessor or other similar hardware, they may be programmed and controlled using software to perform various functions discussed herein, and may be optionally driven by firmware and/or software. In addition, each block, unit, and/or module may be implemented by dedicated hardware, or be implemented by a combination of the dedicated hardware which performs some functions and a processor which performs different functions (e.g. one or more programmed microprocessors and related circuits). Furthermore, in some embodiments, blocks, units and/or modules may be physically separated into two or more individual blocks, units and/or modules which interact with each other without departing from the scope of the inventive concept. In some embodiments, blocks, units and/or modules may be physically combined into more complex blocks, units and/or modules without departing from the scope of the inventive concept.

The term "connection" between two components may embrace electrical connection and physical connection, but the present disclosure is not limited thereto. For example, the term "connection" used in description with reference to a circuit diagram may refer to electrical connection, and the term "connection" used in description with reference to a sectional view or a plan view may refer to physical connection.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure.

However, the present disclosure is not limited to the following embodiments and may be modified into various forms. Each embodiment to be described below may be implemented alone, or combined with at least another embodiment to make various combinations of embodiments.

FIG. 1 is a diagram illustrating a display device 100 according to some embodiments of the present disclosure.

Referring to FIG. 1, the display device 100 according to some embodiments of the present disclosure may include a pixel component 110 (or a display panel), a scan driver 120, a data driver 130, a timing controller 140, a power generator 150, and a voltage/current sensing component 160. The scan driver 120, the data driver 130, the timing controller 140, the power generator 150, and the voltage/current sensing component 160 may constitute a driving device provided to driver the pixel component 110.

The pixel component 110 may display images. The pixel component 110 may include pixels PX connected to first scan lines SL1, . . . , SLi, . . . , and SLn, second scan lines SSL1, . . . , SSLi, . . . , and SSLn, data lines DL1, . . . , DLj, . . . , and DLm, and readout lines RL1, . . . , RLj, . . . , and RLm (where n and m each are a natural number of 3 or more).

The pixel PX may be connected to one of the first scan lines SL1 to SLn and one of the data lines DL1 to DLm. Furthermore, the pixel PX may be connected to one of the second scan lines SSL1 to SSLn and one of the readout lines RL1 to RLm.

For example, the pixel PX positioned on the i-th row and the j-th column may be connected to an i-th first scan line SLi, an i-th second scan line SSLi, a j-th data line DLj, and a j-th readout line RLj (where i and j each are a natural number of 2 or more). Furthermore, the pixel PX may be connected to a first power line PL1 to which first driving power (or a first driving power supply) VDD is applied, and a second power line PL2 to which second driving power (or a second driving power supply) VSS is applied.

Here, the first driving power VDD may be power for supplying driving current to the pixel PX. The second driving power VSS may be power for receiving the driving current from the pixel PX. During an emission period of the pixel PX, the first driving power VDD may be set to a voltage higher than the second driving power VSS.

The pixel PX may be initialized by initialization power VINT provided through the readout line RLj in response to a second scan signal provided through the second scan line SSLi, and may be supplied with a data signal (or a data voltage) through the data line DLj in response to a first scan signal provided through the first scan line SLi. The pixel PX may generate light having a luminance corresponding to a data signal while controlling current flowing from the first driving power supply VDD to the second driving power supply VSS via the light emitting element LD (refer to FIG. 2) in response to the data signal. The initialization power VINT may be set to a voltage lower than an operating point (or threshold voltage) of the light emitting element LD.

The scan driver 120 may generate a first scan signal and a second scan signal based on a scan control signal SCS. The first scan signal may be sequentially supplied to the first scan lines SL1 to SLn. The second scan signal may be sequentially supplied to the second scan lines SSL1 to SSLn.

The scan control signal SCS may include a start signal, a clock signal, and the like, and may be provided from the timing controller 140 to the scan driver 120. The scan driver 120 may be implemented as a shift register configured to sequentially generate and output the first scan signal in the form of a pulse by sequentially shifting the start signal based on the clock signal. Furthermore, the scan driver 120 may generate and output the second scan signal in a manner that is the same or similar to the scheme of generating the first scan signal.

The scan driver 120 along with the pixel PX may be formed in the pixel component 110. Embodiments according to the present disclosure are not limited to the aforementioned example. For example, the scan driver 120 may be mounted on a circuit film, and may be connected to the timing controller 140 via at least one circuit film and a printed circuit board.

The data driver 130 may generate a data signal (or a data voltage) based on output data Dout and a data control signal DCS that are provided from the timing controller 140, and provide the data signal to the pixel component 110 (or the pixel PX) through the data lines DL1 to DLm. Here, the data control signal DCS may include a data enable signal, a data clock signal, and the like. The data driver 130 may provide the initialization power VINT to the pixel component 110 (or the pixel PX) through the readout lines RL1 to RLm.

According to some embodiments, the data driver 130 may receive a sensing signal through the readout lines RL1 to RLm in a separate sensing period (e.g., in a sensing period allocated to sense characteristic information of the pixel PX such as a threshold voltage and/or mobility of a driving transistor included in the pixel PX). The sensing signal may be used to compensate for the characteristics (or a characteristic deviation) of the pixel PX in the data driver 130 and/or the timing controller 140.

According to some embodiments, the readout lines RL1 to RLm may be connected to a separate sensing component. In this case, the sensing component may supply the voltage of the initialization power VINT to the pixel component 110, or may receive a sensing signal through the readout lines RL1 to RLm.

The timing controller 140 may receive input data Din and a control signal CS from an external device (e.g., a graphic processor), and generate a scan control signal SCS and a data control signal DCS based on the control signal CS. The timing controller 140 may convert the input data Din and generate output data Dout. Furthermore, the timing controller 140 may generate a sensing control signal SECS and supply the sensing control signal SECS to the voltage/current sensing component 160.

According to some embodiments, the timing controller 140 may calculate loads of pieces of input data Din. Furthermore, the timing controller 140 may extract peak grayscale values of the pieces of the input data Din. The timing controller 140 may generate a voltage code Vcode based on the loads and peak grayscale values of the pieces of input data Din, and supply the generated voltage code Vcode to the power generator 150. The power generator 150 may control the voltage of the first driving power VDD in response to the voltage code Vcode.

In other words, the voltage of the first driving power VDD may change in response to the loads and peak grayscale values of the pieces of input data Din. In this case, the power consumption of the display device 100 may be relatively reduced. A process of generating the voltage code Vcode in the timing controller 140 will be described in more detail below with reference to FIG. 6.

The power generator 150 may supply the first driving power VDD, the second driving power VSS, and the initialization power Vint to the pixel component 110. Here, the power generator 150 may change the voltage of the first driving power VDD in response to the voltage code Vcode. Furthermore, the power generator 150 may provide a driving voltage needed to drive at least one of the scan driver 120, the data driver 130, the timing controller 140, or the voltage/current sensing component 160. The power generator 150 may be implemented as a power management IC (PMIC).

The first driving power VDD may be supplied to the pixel component 110 through the first power line PL1. The second driving power VSS may be supplied to the pixel component 110 through the second power line PL2. The initialization power VINT may be supplied to the data driver 130 through a third power line PL3. The first power line PL1 and the second power line PL2 may be connected in common to the pixels PX.

A sensing resistor Rs may be connected to the first power line PL1. In this case, the voltage (and current) of the first driving power VDD may be supplied to the pixel component 110 via the sensing resistor Rs.

The voltage/current sensing component 160 may be electrically connected to opposite ends of the sensing resistor Rs. The voltage/current sensing component 160 may sense the voltage or current of the first driving power VDD in response to a sensing control signal SECS.

According to some embodiments, the voltage/current sensing component 160 may sense the voltage of the first driving power VDD during a correction period in response to the sensing control signal SECS. For example, the correction period may be positioned at a time point at which power is supplied to the display device 100, or a time point at which power is supplied to the display device 100 after the usage time of the display device 100 exceeds a preset threshold value. For instance, the correction period may be included in a process of producing the display device 100. A sensing voltage SV sensed in the voltage/current sensing component 160 may be supplied to the timing controller 140. The timing controller 140 may compare the sensing voltage SV sensed in the voltage/current sensing component 160 with a target voltage, and correct the voltage code Vcode (or generate a compensation LUT) to make the sensing voltage SV identical to the target voltage.

The voltage/current sensing component 160 may sense the current of the first driving power VDD during a period except a correction period in response to the sensing control signal SECS. Here, the period except the correction period may include a period in which images are displayed on the display device 100. Sensing current SC sensed in the voltage/current sensing component 160 may be supplied to the timing controller 140. For example, the timing controller 140 may generate the output data Dout by correcting the input data Din in response to the sensing current SC. For instance, the timing controller 140 may control the display device 100 in various known methods in response to the sensing current SC.

Figure 2:
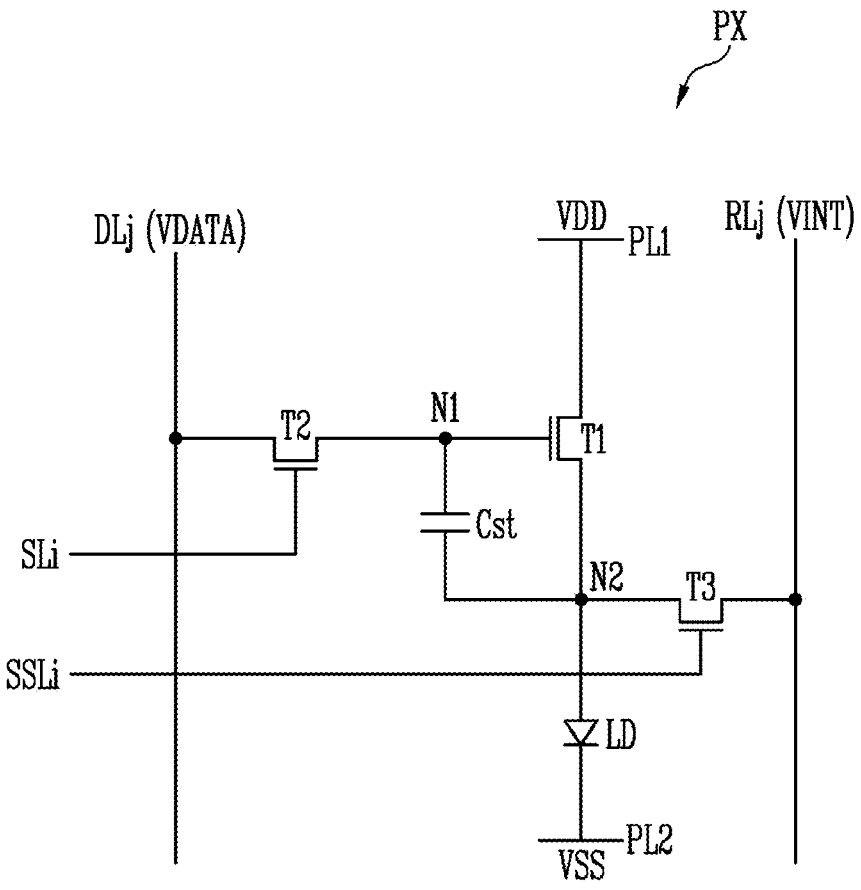
FIG. 2 is a diagram illustrating aspects of a pixel shown in FIG. 1 according to some embodiments of the present disclosure.

FIG. 2 is a diagram illustrating aspects of the pixel PX shown in FIG. 1 according to some embodiments of the present disclosure. FIG. 2 illustrates the pixel PX located on an i-th row and a j-th column. The pixel PX illustrated in FIG. 2 is an example structure, and the structure of the pixel PX according to some embodiments of the present disclosure are not limited thereto. For example, according to some embodiments of the present disclosure, the pixel PX may be selected as any one of various known circuits. According to some embodiments, the pixel PX may include additional components or fewer components without departing from the spirit and scope of embodiments according to the present disclosure.

Referring to FIG. 2, the pixel PX may be connected to the first scan line SLi, the second scan line SSLi, the data line DLj, and the readout line RLj.

The pixel PX may include a light emitting element LD, a first transistor T1 (or a driving transistor), a second transistor T2, a third transistor T3, and a storage capacitor Cst. Each of the first transistor T1, the second transistor T2, and the third transistor T3 may be formed of a thin-film transistor including an oxide semiconductor, but is not limited thereto. For example, at least some of the first transistor T1, the second transistor T2, and the third transistor T3 may include a polysilicon semiconductor, or may be implanted as an N-type semiconductor or a P-type semiconductor.

The light emitting element LD may include a first electrode (or an anode electrode) connected to a first power line PL1 via a second node N2 and a first transistor T1, and a second electrode (or a cathode electrode) connected to a second power line PL2. The light emitting element LD may emit light at a luminance corresponding to driving current supplied from the first transistor T1.

An organic light emitting diode may be selected as the light emitting element LD. Furthermore, an inorganic light emitting diode such as a micro light emitting diode (LED) or a quantum dot light emitting diode may be selected as the light emitting element LD. The light emitting element LD may be an element formed of a combination of organic material and inorganic material. Although FIG. 2 illustrates that the pixel PX includes a single light emitting element LD, the pixel PX according to some embodiments may include a plurality of light emitting elements. The plurality of light emitting elements may be connected in series, parallel or series-parallel to each other.

The first transistor T1 may include a first electrode (e.g., a drain electrode) connected to the first power line PL1 to which the first driving power VDD is applied, and a second electrode (e.g., a source electrode) connected to the second node N2. A gate electrode of the first transistor T1 may be connected to a first node N1. The first transistor T1 may control the amount of current flowing to the light emitting element LD in response to the voltage of the first node N1 (or a gate-source voltage applied between the second electrode and the gate electrode of the first transistor).

The second transistor T2 may include a first electrode connected to the data line DLj, and a second electrode connected to the first node N1. A gate electrode of the second transistor T2 may be connected to the first scan line SLi. In the case where a first scan signal is supplied to the first scan line SLi, the second transistor T2 may be turned on to transmit a data signal VDATA from the data line DLj to the first node N1.

The storage capacitor Cst may be formed or connected between the first node N1 and the second node N2. The storage capacitor Cst may store the voltage of the first node N1.

The third transistor T3 may be connected between the readout line RLj and the second node N2. A gate electrode of the third transistor T3 may be connected to the second scan line SSLi. In the case where a scan signal is supplied to the second scan line SSLi, the third transistor T3 may be turned on to transmit the voltage of the initialization power VINT from the readout line RLj to the second node N2.

In the case where the second transistor T2 and the third transistor T3 are simultaneously turned on in response to the first scan signal and the second scan signal, a voltage difference between the data signal VDATA and the initialization power VINT is stored in the storage capacitor Cst. The first transistor T1 may control the amount of current flowing through the light emitting element LD in response to the voltage difference stored in the storage capacitor Cst.

Unlike this, in the case where the third transistor T3 is turned on during the sensing period to connect the second node N2 and the readout line RLj, a sensing signal may be provided from the pixel PX to the readout line RLj.

Figure 3:
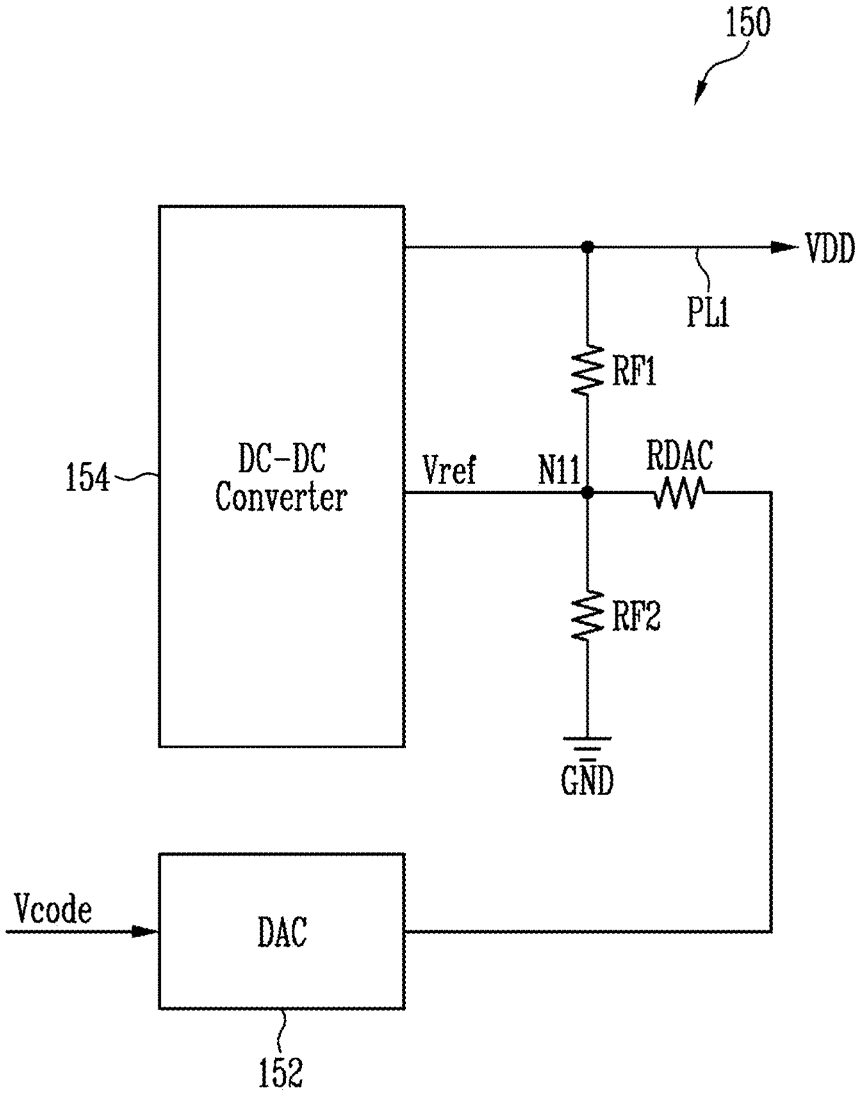
FIG. 3 is a diagram illustrating a power generator according to some embodiments of the present disclosure.

FIG. 3 is a diagram illustrating the power generator 150 according to some embodiments of the present disclosure. In FIG. 3, there is illustrated only the configuration needed to describe embodiments according to the present disclosure (i.e., the configuration for generating the first driving power VDD). According to some embodiments the power generator 150 may include additional components without departing from the spirit and scope of embodiments according to the present disclosure.

Referring to FIG. 3, the power generator 150 according to some embodiments of the present disclosure may include a digital to analog converter (DAC) 152, and a DC-DC converter 154.

The DAC 152 may generate a reference voltage Vref (or a feedback voltage) corresponding to the voltage code Vcode, and supply the reference voltage Vref to the DC-DC converter 154. For example, the DAC 152 may supply the reference voltage Vref ranging from 0 V to 3.3 V (or the maximum 4.8 V) in response to the voltage code Vcode to the DC-DC converter 154.

The power generator 150 may further include a first resistor RDAC connected between the DAC 152 and a first node N11, a first feedback resistor RF1 connected between the first power line PL1 and the first node N11, and a second feedback resistor RF2 connected between the first node N11 and ground power supply GND. The first node N11 may be electrically connected to the DC-DC converter 154, and may transmit the reference voltage Vref supplied thereto via the first resistor RDAC to the DC-DC converter 154.

The DC-DC converter 154 may generate the first driving power VDD based on the reference voltage Vref and supply the first driving power VDD to the first power line PL1. Furthermore, the DC-DC converter 154 may finely control the voltage of the first driving power VDD using a feedback voltage by the first feedback resistor RF1 and the second feedback resistor RF2.

To enable the pixel PX to generate light having a desired luminance, the first driving power VDD generated from the DC-DC converter 154 must accurately maintain a target voltage corresponding to the voltage code Vcode. For example, if the voltage of the first driving power VDD is different from the target voltage, the pixel PX cannot generate light having a desired luminance.

However, the first driving power VDD may differ from the target voltage due to tolerance of the DAC 152 and tolerance of the feedback resistors RF1 and RF2. For example, the tolerance of each of the DAC 152 and the feedback resistors RF1 and RF2 may be set to ±1%. Due to the tolerance, the first driving power VDD may differ from the target voltage. According to some embodiments of the present disclosure, it may be possible to generate the first driving power VDD identical to the target voltage regardless of the tolerance of the circuits (e.g., DAC, RF1, RF2, and the like).

Figure 4:
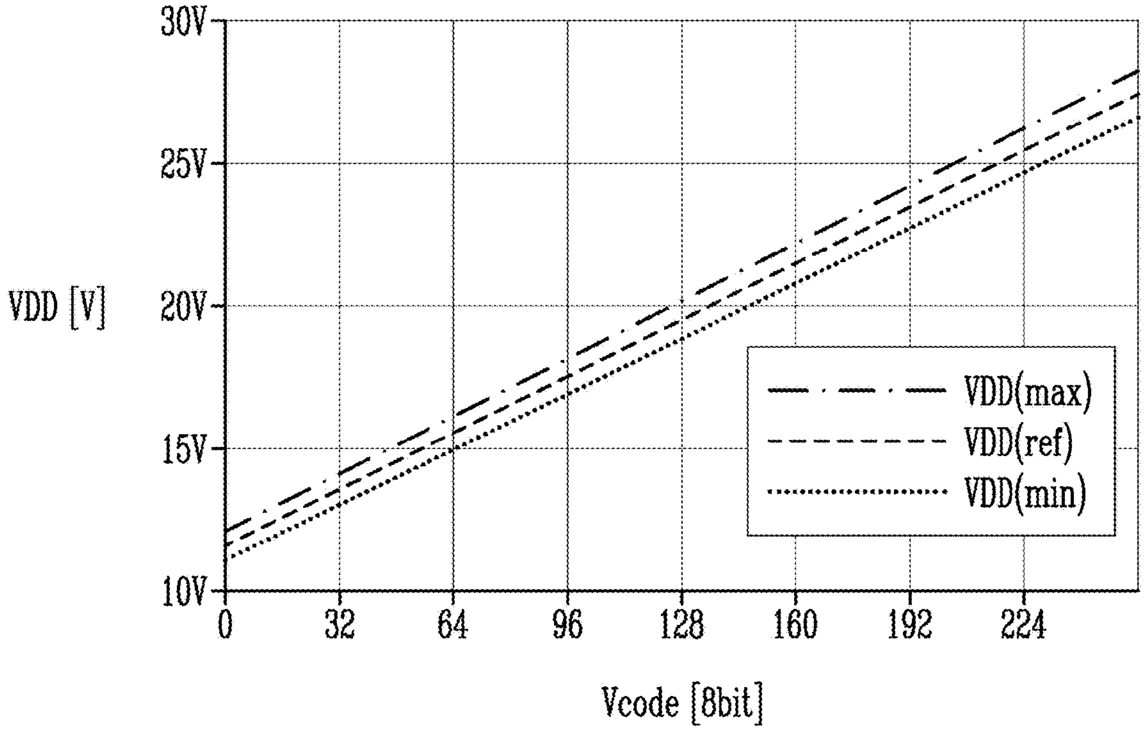
FIG. 4 is a diagram illustrating the voltage of first driving power as a function of a voltage code according to some embodiments of the present disclosure.
Figure 5:
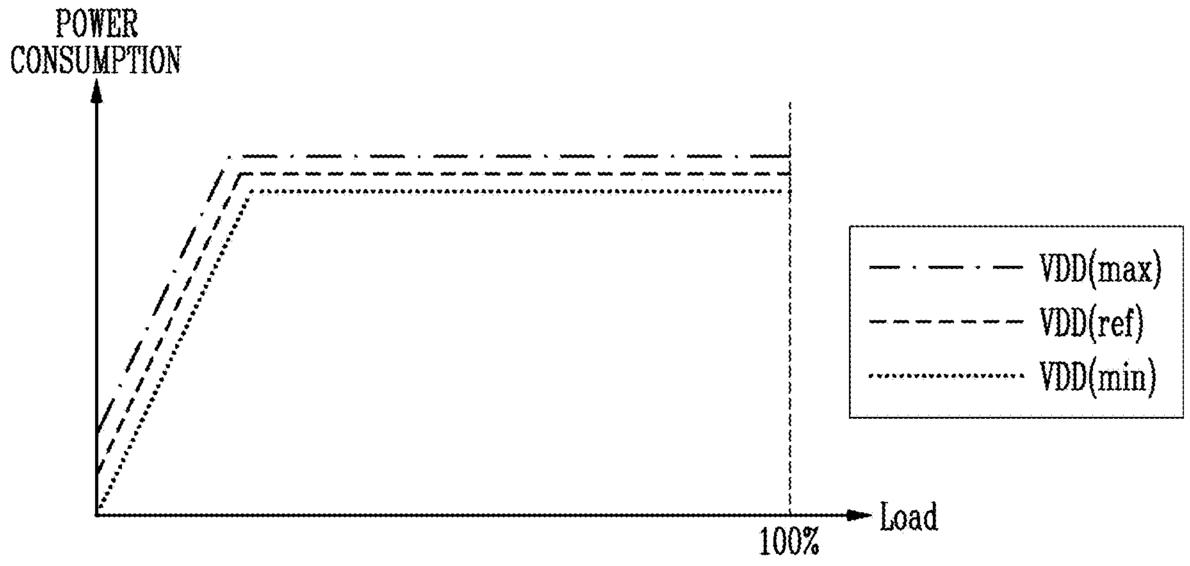
FIG. 5 is a diagram illustrating power consumption as a function of the load of a pixel component according to some embodiments of the present disclosure.

FIG. 4 is a diagram illustrating the voltage of the first driving power VDD as a function of the voltage code. FIG. 5 is a diagram illustrating power consumption as a function of the load Load of the pixel component 110.

In FIG. 4, it is assumed that the voltage code Vcode is 8 bit. The voltage of the first driving power VDD may be changed to approximately 12 V to approximately 28 V (where 12 V to 28 V are example values, and embodiments according to the present disclosure are not limited thereto) in response to the load and peak grayscale value of the pixel component 110. In other words, the power generator 150 may generate the first driving power VDD having a voltage ranging from approximately 12 V to approximately 28 V based on the voltage code Vcode.

Referring to FIG. 4, VDD(ref) denotes the target voltage of the first driving power VDD. In the case where there is no tolerance of the circuits, the voltage generator 150 may generate the first driving power VDD having a voltage of VDD(ref) in response to the voltage code. However, the voltage generator 150 may generate a voltage (i.e., VDD (min)) of the first driving power VDD lower than the VDD(ref) or a voltage (i.e., VDD(max)) of the first driving power VDD higher than the VDD(ref) due to the tolerance of the circuits.

For example, in the case where the voltage of the first driving power VDD is higher than the target voltage (i.e., VDD(ref)), the voltage of the first driving power VDD may be set to a value higher than the preset power consumption of the display device 100, as illustrated FIG. 5. In this case, circuits included in the display device 100 may be damaged, and in severe cases, circuits may be burned.

Figure 6:
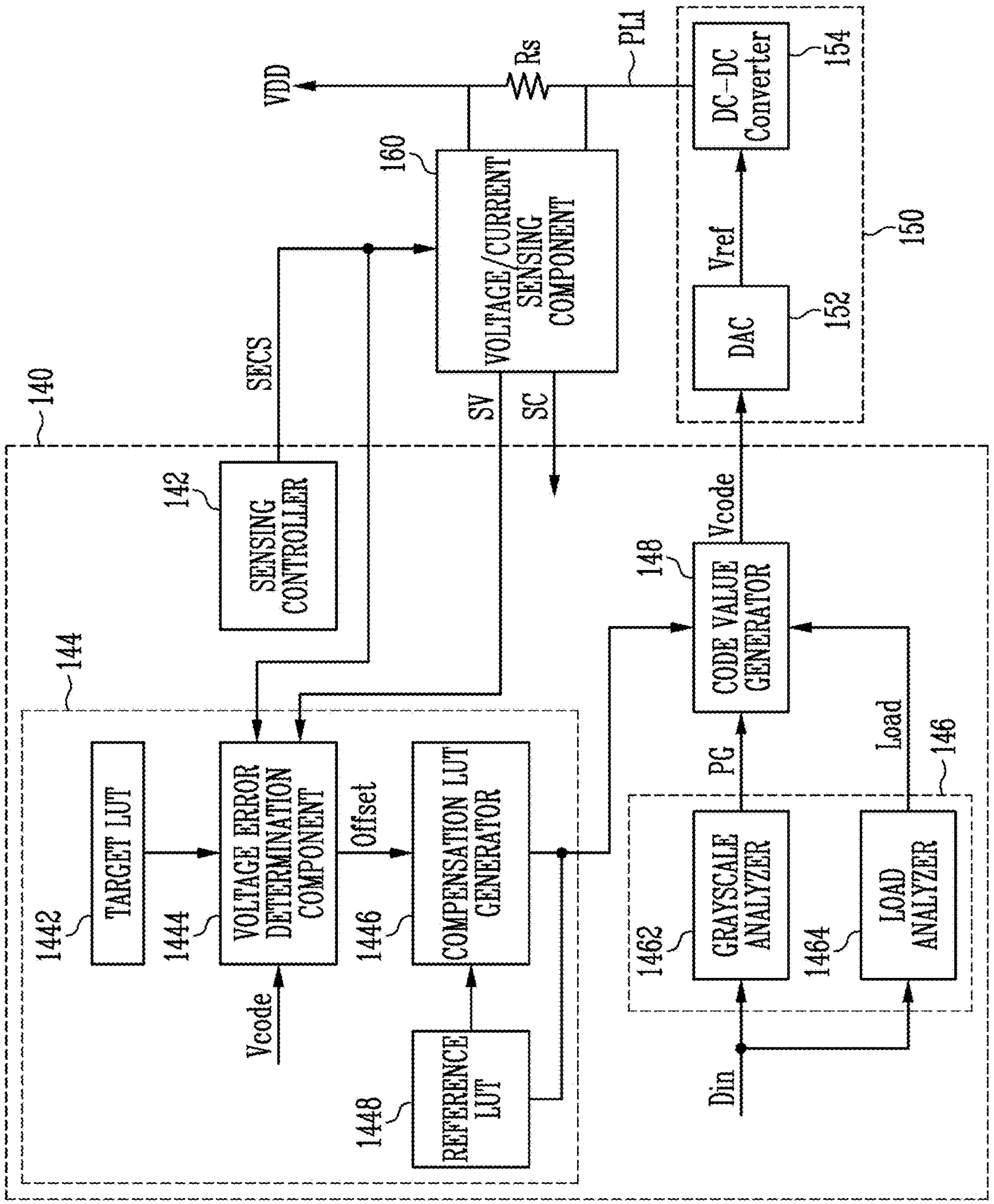
FIG. 6 is a diagram illustrating a timing controller according to some embodiments of the present disclosure.

FIG. 6 is a diagram illustrating the timing controller 140 according to some embodiments of the present disclosure. Although FIG. 6 illustrates the timing controller 140 including various components, but embodiments according to the present disclosure are not limited thereto. For example, according to various embodiments, the timing controller 140 may include additional components or fewer components without departing from the spirit and scope of embodiments according to the present disclosure.

Referring to FIG. 6, the timing controller 140 may include a sensing controller 142, a voltage adjuster 144, an analyzer 146, and a code value generator 148.

The analyzer 146 may calculate (or analyze) a load Load of the input data Din, or may extract a peak grayscale value (or maximum grayscale value) PG. To this end, the analyzer 146 may include a grayscale analyzer 1462 and a load analyzer 1464.

The grayscale analyzer 1462 may extract the peak grayscale value PG from the input data Din of one frame. Here, the peak grayscale value PG may refer to a highest grayscale value in the input data Din included in one frame.

The load analyzer 1464 may calculate a load Load of one frame due to the input data Din. For example, the load analyzer 1464 may calculate the load Load by averaging grayscale values of the input data Din of one frame. Various known methods may be used as a method of calculating the load by the load analyzer 1464.

The code value generator 148 may generate a voltage code Vcode corresponding to the voltage of the first driving power VDD to be supplied to a current frame in response to the peak grayscale value PG and the load Load, and may supply the generated voltage code Vcode to the power generator 150.

The sensing controller 142 may supply the sensing control signal SECS to the voltage/current sensing component 160. For example, the sensing controller 142 may supply the sensing control signal SECS (e.g., the correction period) to allow the current/voltage sensing component 160 to sense a voltage at least once during the production process. For example, the sensing controller 142 may supply the sensing control signal SECS (e.g., during the correction period) to allow the current/voltage sensing component 160 to sense a voltage at a time point (or power-on time point) at which power is supplied to the display device 100, or at a time point at which power is supplied to the display device 100 after the usage time of the display device 100 exceeds the preset threshold value. The sensing controller 142 may supply the sensing control signal SECS to allow the current/voltage sensing component 160 to sense current during a period in which the display device 100 is normally driven.

The voltage/current sensing component 160 may sense the voltage or current of the first driving power VDD from the sensing resistor Rs in response to the sensing control signal SECS. A sensing voltage SV sensed in the voltage/current sensing component 160 may be supplied to the voltage adjuster 144. The sensing current SC sensed in the voltage/current sensing component 160 may be supplied to a scale controller or the like.

The voltage adjuster 144 may include a target look-up table (LUT) 1442, a voltage error determination component 1444, a reference LUT 1448, and a compensation LUT generator 1446.

The target LUT 1442 may store a voltage value (or a target voltage, or an aim voltage) of the first driving power VDD to be supplied to the pixel component 110 in response to the voltage code Vcode.

The voltage error determination component 1444 may compare the target voltage corresponding to the voltage code Vcode with the sensing voltage SV sensed by the current/voltage sensing component 160, and generate an offset Offset corresponding to a result of the comparison. Here, the offset Offset may be controlled such that the target voltage and the sensing voltage SV match with each other.

The reference LUT 1448 may store the voltage of the first driving power VDD corresponding to the voltage code Vcode. The reference LUT 1448 may be an LUT identical to the target LUT 1442.

The compensation LUT generator 1446 may generate a compensation LUT by reflecting the offset Offset in the reference LUT 1448. The compensation LUT may be stored in the compensation LUT generator 1446, and may be set such that the target voltage and the sensing voltage SV match with each other. In other words, the compensation LUT is generated by reflecting the offset Offset in the reference LUT 1448. In the case where the voltage code Vcode is generated by using the compensation LUT, the target voltage and the sensing voltage SV may be the same as each other.

Figures 7A, 7B:
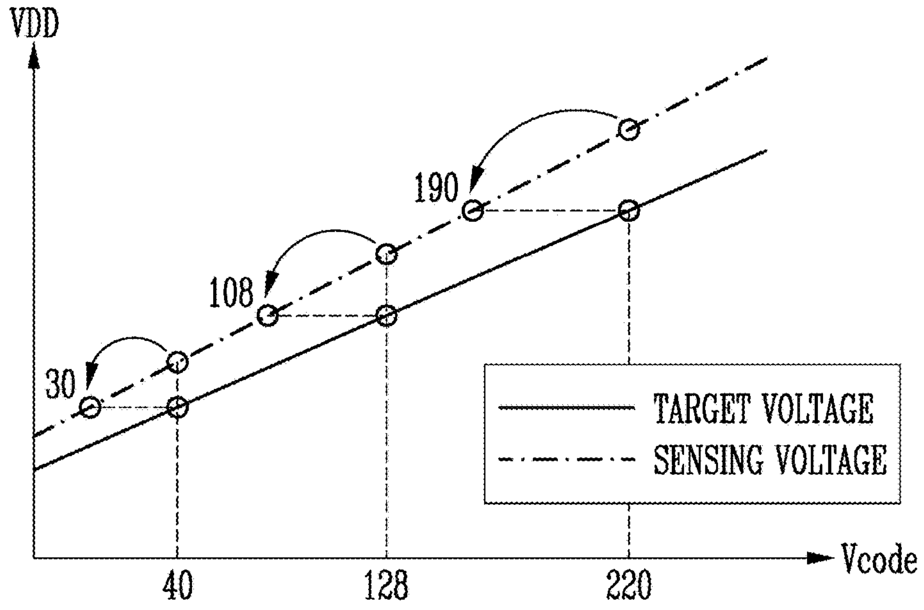
FIGS. 7A and 7B are diagrams illustrating a method of generating a compensation look-up table (LUT) in the case where a sensing voltage is higher than a target voltage according to some embodiments of the present disclosure.

FIGS. 7A and 7B are diagrams illustrating a method of generating the compensation LUT in the case where the sensing voltage SV is higher than the target voltage.

Referring to FIGS. 6 to 7B, during the correction period, the sensing controller 142 may supply a sensing control signal SECS (e.g., a sensing control signal SECS of a first level) to allow the current/voltage sensing component 160 to sense the voltage of the first driving power VDD.

The analyzer 146 may generate a peak grayscale value PG and load Load of one frame using the input data Din, and then supply the peak grayscale value PG and the load to the code value generator 148. For example, the input data Din inputted during the correction period may be pre-stored in the timing controller 140. For example, the input data Din inputted during the correction period may be supplied from an external device provided outside the display device 100.

The code value generator 148 may generate a voltage code Vcode in response to the peak grayscale value PG and the load Load. Here, before the compensation LUT is generated, the code value generator 148 may generate the voltage code Vcode using the reference LUT 1448.

The DAC 152 that receives the voltage code Vcode may supply a reference voltage Vref corresponding to the voltage code Vcode to the DC-DC converter 154. The DC-DC converter 154 may supply a voltage of the first driving power VDD corresponding to the reference voltage Vref to the first power line PL1.

The current/voltage sensing component 160 may measure the voltage of the first driving power VDD using the voltage across the sensing resistor Rs, and supply the voltage of the first driving power VDD to the voltage error determination component 1444 as the sensing voltage SV.

The voltage error determination component 1444 may determine that the voltage of the first driving power VDD is measured by the current/voltage sensing component 160 in response to the sensing control signal SECS. The voltage error determination component 1444 may determine a target voltage of the first driving power VDD using the target LUT 1442 (or the reference LUT 1448) and the voltage code Vcode inputted from the code value generator 148.

For example, in the case where the voltage code Vcode corresponds to a first grayscale value under certain load conditions, the voltage error determination component 1444 may set the target voltage to 13.5 V using the target LUT 1442. In the case where the voltage code Vcode corresponds to a second grayscale value under certain load conditions, the voltage error determination component 1444 may set the target voltage to 19.0 V using the target LUT 1442. In the case where the voltage code Vcode corresponds to a third grayscale value under certain load conditions, the voltage error determination component 1444 may set the target voltage to 24.8 V using the target LUT 1442.

According to some embodiments, in the case where the voltage code Vcode corresponds to the first grayscale value and the sensing voltage SV is set to 14.1 V, a value obtained by subtracting the sensing voltage SV from the target voltage is set to −0.6 V. The voltage error determination component 1444 may supply an offset Offset corresponding to −0.6 V, e.g., an offset of −10, to the compensation LUT generator 1446.

According to some embodiments, in the case where the voltage code Vcode corresponds to the second grayscale value and the sensing voltage SV is set to 20.2V, a value obtained by subtracting the sensing voltage SV from the target voltage is set to −1.2V. The voltage error determination component 1444 may supply an offset Offset corresponding to −1.2V, e.g., an offset of −20, to the compensation LUT generator 1446.

According to some embodiments, in the case where the voltage code Vcode corresponds to the third grayscale value and the sensing voltage SV is set to 26.6V, a value obtained by subtracting the sensing voltage SV from the target voltage is set to −1.8V. The voltage error determination component 1444 may supply an offset Offset corresponding to −1.8V, e.g., an offset of −30, to the compensation LUT generator 1446.

The compensation LUT generator 1446 may extract a voltage code Vcode (e.g., 40) corresponding to the first grayscale value from the reference LUT 1448, and generate a compensation LUT by reflecting an offset Offset (e.g., −10) in the voltage code Vcode. In this case, in the compensation LUT, the voltage code Vcode corresponding to the first grayscale value may be set to 30.

Thereafter, the code value generator 148 may generate a voltage code Vcode using the compensation LUT. In this case, the voltage code Vcode of 30 corresponding to the first grayscale value may be supplied to the voltage generator 150. Then, the sensing voltage SV measured by the current/voltage sensing component 160 may be set to the same voltage (e.g., 13.5 V) as the target voltage.

The compensation LUT generator 1446 may extract a voltage code Vcode (e.g., 128) corresponding to the second grayscale value from the reference LUT 1448, and generate a compensation LUT by reflecting an offset Offset (e.g., −20) in the voltage code Vcode. In this case, in the compensation LUT, the voltage code Vcode corresponding to the second grayscale value may be set to 108.

Thereafter, the code value generator 148 may generate a voltage code Vcode using the compensation LUT. In this case, the voltage code Vcode of 108 corresponding to the second grayscale value may be supplied to the voltage generator 150. Then, the sensing voltage SV measured by the current/voltage sensing component 160 may be set to the same voltage (e.g., 19.0 V) as the target voltage.

The compensation LUT generator 1446 may extract a voltage code Vcode (e.g., 220) corresponding to the third grayscale value from the reference LUT 1448, and generate a compensation LUT by reflecting an offset Offset (e.g., −30) in the voltage code Vcode. In this case, in the compensation LUT, the voltage code Vcode corresponding to the third grayscale value may be set to 190.

Thereafter, the code value generator 148 may generate a voltage code Vcode using the compensation LUT. In this case, the voltage code Vcode of 190 corresponding to the third grayscale value may be supplied to the voltage generator 150. Then, the sensing voltage SV measured by the current/voltage sensing component 160 may be set to the same voltage (e.g., 24.8V) as the target voltage.

In addition, the compensation LUT generator 1446 may generate remaining grayscale values, other than the first grayscale value, the second grayscale value, and the third grayscale value, at a certain load Load by interpolation. In other words, the compensation LUT generator 1446 may generate a compensation LUT corresponding to all grayscale values at a certain load Load.

As described above, according to some embodiments of the present disclosure, the voltage of the first driving power VDD to be supplied to the pixel component 110 may be controlled to be the same as the target voltage, whereby the reliability of the operation can be secured. Furthermore, in the case the voltage of the first driving power VDD is set to the same voltage as the target voltage, the pixel component 110 may display an image of a desired luminance.

Figures 8A, 8B:
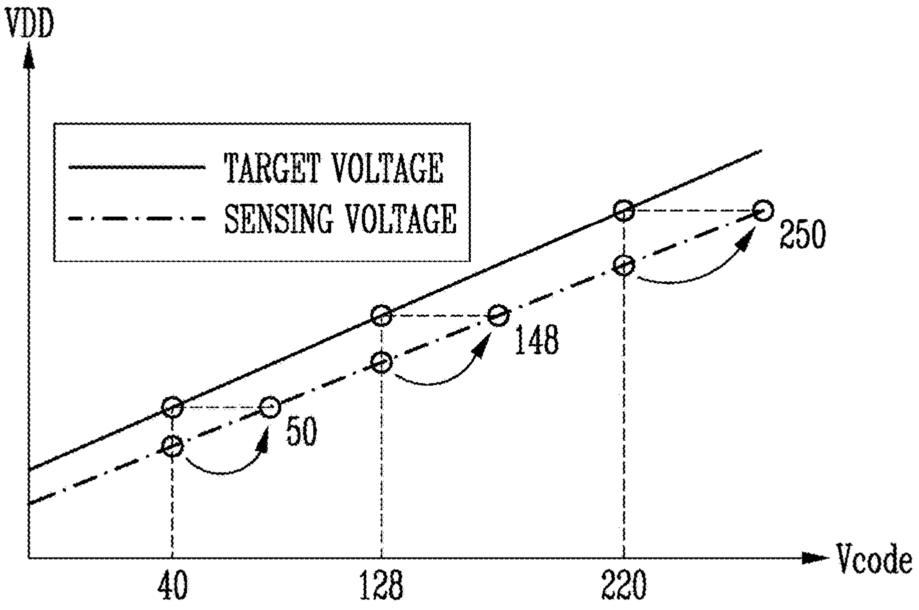
FIGS. 8A and 8B are diagrams illustrating a method of generating the compensation LUT in the case where the sensing voltage is lower than the target voltage according to some embodiments of the present disclosure.

FIGS. 8A and 8B are diagrams illustrating a method of generating the compensation LUT in the case where the sensing voltage SV is lower than the target voltage. In the following description of FIGS. 8A and 8B, some redundant explanation of the configuration described with reference to FIGS. 7A and 7B may be omitted.

Referring to FIGS. 6, 8A, and 8B, the voltage error determination component 1444 may determine a target voltage of the first driving power VDD using the target LUT 1442 (or the reference LUT 1448) and the voltage code Vcode inputted from the code value generator 148.

For example, in the case where the voltage code Vcode corresponds to the first grayscale value under certain load conditions, the voltage error determination component 1444 may set the target voltage to 13.5 V using the target LUT 1442. In the case where the voltage code Vcode corresponds to the second grayscale value under certain load conditions, the voltage error determination component 1444 may set the target voltage to 19.0 V using the target LUT 1442. In the case where the voltage code Vcode corresponds to the third grayscale value under certain load conditions, the voltage error determination component 1444 may set the target voltage to 24.8 V using the target LUT 1442.

According to some embodiments, in the case where the voltage code Vcode corresponds to the first grayscale value and the sensing voltage SV is set to 12.9 V, a value obtained by subtracting the sensing voltage SV from the target voltage is set to 0.6 V. The voltage error determination component 1444 may supply an offset Offset corresponding to 0.6 V, e.g., an offset of 10, to the compensation LUT generator 1446.

According to some embodiments, in the case where the voltage code Vcode corresponds to the second grayscale value and the sensing voltage SV is set to 17.8 V, a value obtained by subtracting the sensing voltage SV from the target voltage is set to 1.2 V. The voltage error determination component 1444 may supply an offset Offset corresponding to 1.2 V, e.g., an offset Offset of 20, to the compensation LUT generator 1446.

According to some embodiments, in the case where the voltage code Vcode corresponds to the third grayscale value and the sensing voltage SV is set to 23.0 V, a value obtained by subtracting the sensing voltage SV from the target voltage is set to 1.8 V. The voltage error determination component 1444 may supply an offset Offset corresponding to 1.8 V, e.g., an offset Offset of 30, to the compensation LUT generator 1446.

The compensation LUT generator 1446 may extract a voltage code Vcode (e.g., 40) corresponding to the first grayscale value from the reference LUT 1448, and generate a compensation LUT by reflecting an offset Offset (e.g., 10) in the voltage code Vcode. In this case, in the compensation LUT, the voltage code Vcode corresponding to the first grayscale value may be set to 50.

Thereafter, the code value generator 148 may generate a voltage code Vcode using the compensation LUT. In this case, the voltage code Vcode of 50 corresponding to the first grayscale value may be supplied to the voltage generator 150. Then, the sensing voltage SV measured by the current/voltage sensing component 160 may be set to the same voltage (e.g., 13.5 V) as the target voltage.

The compensation LUT generator 1446 may extract a voltage code Vcode (e.g., 128) corresponding to the second grayscale value from the reference LUT 1448, and generate a compensation LUT by reflecting an offset Offset (e.g., 20) in the voltage code Vcode. In this case, in the compensation LUT, the voltage code Vcode corresponding to the second grayscale value may be set to 148.

Thereafter, the code value generator 148 may generate a voltage code Vcode using the compensation LUT. In this case, the voltage code Vcode of 148 corresponding to the second grayscale value may be supplied to the voltage generator 150. Then, the sensing voltage SV measured by the current/voltage sensing component 160 may be set to the same voltage (e.g., 19.0 V) as the target voltage.

The compensation LUT generator 1446 may extract a voltage code Vcode (e.g., 220) corresponding to the third grayscale value from the reference LUT 1448, and generate a compensation LUT by reflecting an offset Offset (e.g., 30) in the voltage code Vcode. In this case, in the compensation LUT, the voltage code Vcode corresponding to the third grayscale value may be set to 250.

Thereafter, the code value generator 148 may generate a voltage code Vcode using the compensation LUT. In this case, the voltage code Vcode of 250 corresponding to the third grayscale value may be supplied to the voltage generator 150. Then, the sensing voltage SV measured by the current/voltage sensing component 160 may be set to the same voltage (e.g., 24.8 V) as the target voltage.

In addition, the compensation LUT generator 1446 may generate remaining grayscale values, other than the first grayscale value, the second grayscale value, and the third grayscale value, at a certain load Load by interpolation. In other words, the compensation LUT generator 1446 may generate a compensation LUT corresponding to all grayscale values at a certain load Load.

Figures 9A, 9B:
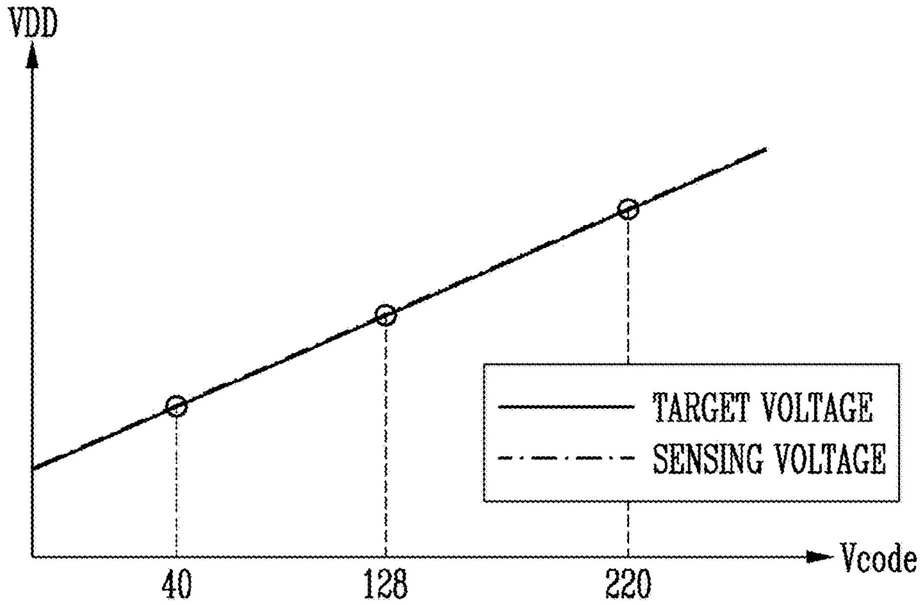
FIGS. 9A and 9B are diagrams illustrating a method of generating the compensation LUT in the case where the target voltage and the sensing voltage are the same according to some embodiments of the present disclosure.

FIGS. 9A and 9B are diagrams illustrating a method of generating the compensation LUT in the case where the target voltage and the sensing voltage SV are the same. In the following description of FIGS. 9A and 9B, some redundant explanation of the configuration described with reference to FIGS. 7A and 7B may be omitted.

Referring to FIGS. 6, 9A, and 9B, the voltage error determination component 1444 may determine a target voltage of the first driving power VDD using the target LUT 1442 (or the reference LUT 1448) and the voltage code Vcode inputted from the code value generator 148.

For example, in the case where the voltage code Vcode corresponds to the first grayscale value under certain load conditions, the voltage error determination component 1444 may set the target voltage to 13.5 V using the target LUT 1442. In the case where the voltage code Vcode corresponds to the second grayscale value under certain load conditions, the voltage error determination component 1444 may set the target voltage to 19.0 V using the target LUT 1442. In the case where the voltage code Vcode corresponds to the third grayscale value under certain load conditions, the voltage error determination component 1444 may set the target voltage to 24.8 V using the target LUT 1442.

According to some embodiments, in the case where the voltage code Vcode corresponds to the first grayscale value and the sensing voltage SV is set to 13.5 V, a value obtained by subtracting the sensing voltage SV from the target voltage is set to 0 V. The voltage error determination component 1444 may supply an offset Offset corresponding to 0 V, e.g., an offset of 0, to the compensation LUT generator 1446.

According to some embodiments, in the case where the voltage code Vcode corresponds to the second grayscale value and the sensing voltage SV is set to 19.0 V, a value obtained by subtracting the sensing voltage SV from the target voltage is set to 0 V. The voltage error determination component 1444 may supply an offset Offset corresponding to 0 V, e.g., an offset of 0, to the compensation LUT generator 1446.

According to some embodiments, in the case where the voltage code Vcode corresponds to the third grayscale value and the sensing voltage SV is set to 24.8 V, a value obtained by subtracting the sensing voltage SV from the target voltage is set to 0 V. The voltage error determination component 1444 may supply an offset Offset corresponding to 0 V, e.g., an offset Offset of 0, to the compensation LUT generator 1446.

The compensation LUT generator 1446 may extract a voltage code Vcode (e.g., 40) corresponding to the first grayscale value from the reference LUT 1448, and generate a compensation LUT by reflecting an offset Offset (e.g., 0) in the voltage code Vcode. The compensation LUT generator 1446 may extract a voltage code Vcode (e.g., 128) corresponding to the second grayscale value from the reference LUT 1448, and generate a compensation LUT by reflecting an offset Offset (e.g., 0) in the voltage code Vcode. The compensation LUT generator 1446 may extract a voltage code Vcode (e.g., 220) corresponding to the third grayscale value from the reference LUT 1448, and generate a compensation LUT by reflecting an offset Offset (e.g., 0) in the voltage code Vcode.

In the case where the target voltage and the sensing voltage SV are the same as each other, the offset Offset may be set to 0. In this case, the compensation LUT may have the same value as the reference LUT 1448.

Figure 10A:
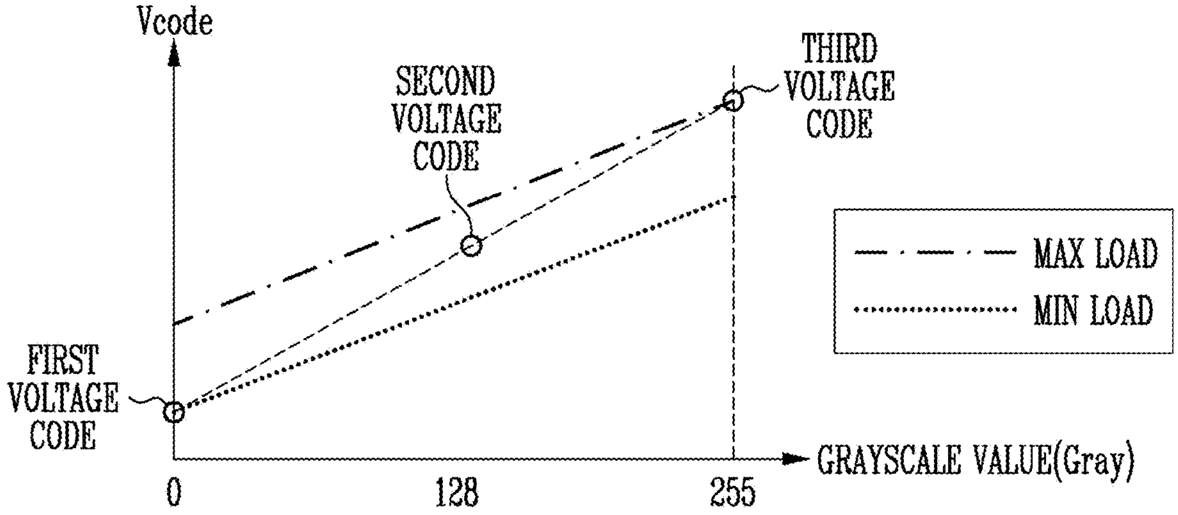
FIGS. 10A and 10B are diagrams illustrating a method of generating the compensation LUT according to some embodiments of the present disclosure.
Figure 10B:
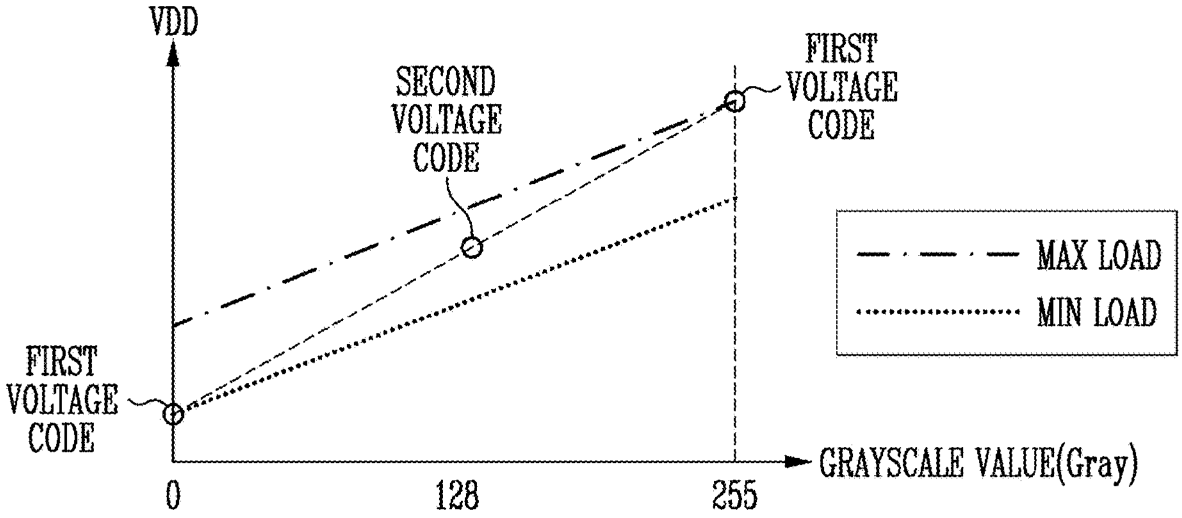

FIGS. 10A and 10B are diagrams illustrating a method of generating the compensation LUT according to some embodiments of the present disclosure. Referring to FIGS. 7A to 9B, the method of generating the compensation LUT using voltage codes corresponding to the first grayscale value, the second grayscale value, and the third grayscale value under certain load conditions has been described. In this case, it is required to generate respective compensation LUTs corresponding to a plurality of loads Load included in the display device 100. Accordingly, a lot of time may be needed to generate the compensation LUTs.

Referring to FIGS. 6, 10A, and 10B, the display device 100 may control the voltage of the first driving power VDD in response to a load between a minimum load and a maximum load.

During a first period of the correction period, the minimum load and input data Din in which the peak grayscale value corresponds to a minimum grayscale value (e.g., 0 Gray) may be supplied to the analyzer 146. Then, the analyzer 146 may supply the minimum load as the load Load and the minimum grayscale value as the peak grayscale value PG to the code value generator 148. The code value generator 148 may supply a first voltage code as the voltage code Vcode. Accordingly, during the first period, a compensation LUT corresponding to the first voltage code may be generated. In this case, a compensation LUT in which an offset Offset is reflected in the first voltage code may be generated so that a target first voltage can be generated.

During a second period of the correction period, an intermediate load and input data Din in which the peak grayscale value corresponds to an intermediate grayscale value (e.g., 128 Gray) may be supplied to the analyzer 146. The intermediate load may refer to a load located in the middle between the minimum load and the maximum load. The intermediate grayscale value may refer to a grayscale value located in the middle between the minimum grayscale value and the maximum grayscale value. The analyzer 146 may supply the intermediate load as the load Load and the intermediate grayscale value as the peak grayscale value PG to the code value generator 148. The code value generator 148 may supply a second voltage code as the voltage code Vcode. Accordingly, during the second period, a compensation LUT corresponding to the second voltage code may be generated. In this case, a compensation LUT in which an offset Offset is reflected in the second voltage code may be generated so that a target second voltage can be generated.

During a third period of the correction period, the maximum load and input data Din in which the peak grayscale value corresponds to a maximum grayscale value (e.g., 255 Gray) may be supplied to the analyzer 146. The analyzer 146 may supply the maximum load as the load Load and the maximum grayscale value as the peak grayscale value PG to the code value generator 148. The code value generator 148 may supply a third voltage code as the voltage code Vcode. Accordingly, during the third period, a compensation LUT corresponding to the third voltage code may be generated. In this case, a compensation LUT in which an offset Offset is reflected in the third voltage code may be generated so that a target third voltage can be generated.

After the compensation LUT corresponding to the minimum load and the minimum grayscale value, the compensation LUT corresponding to the intermediate load and the intermediate grayscale value, and the compensation LUT corresponding to the maximum load and the maximum grayscale value are generated, the compensation LUT generator 1446 may generate remaining values by interpolation. Then, a compensation LUT corresponding to all loads and all grayscale values may be generated in response to three voltage codes Vcode during the period in which the compensation LUT is generated.

Figure 11A:
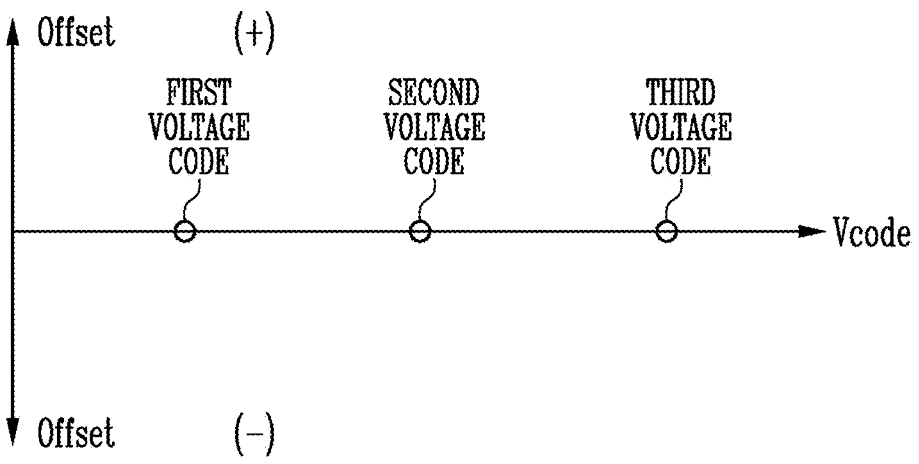
FIGS. 11A and 11B are diagrams illustrating a compensation voltage in the case where an offset is 0 in correspondence with first to third voltage codes according to some embodiments of the present disclosure.
Figure 11B:
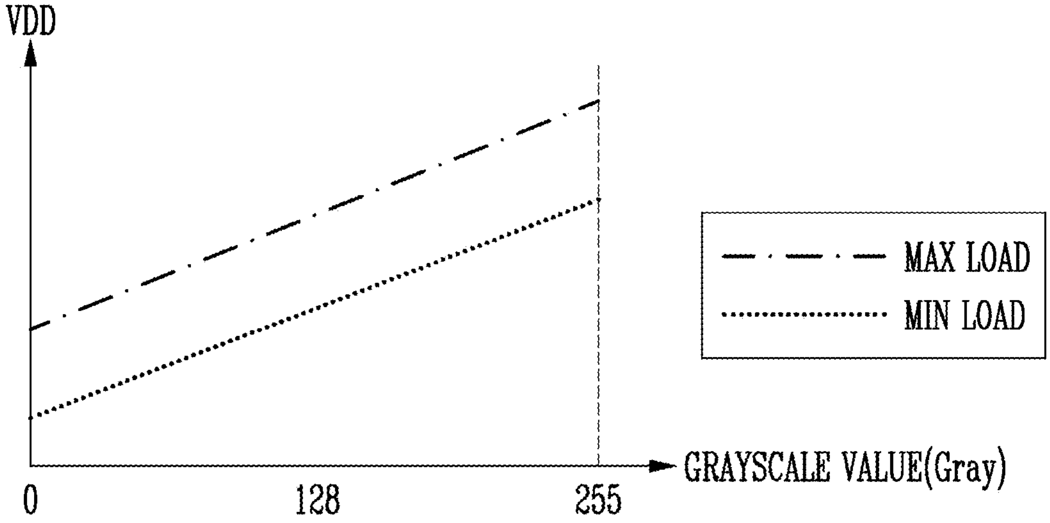

FIGS. 11A and 11B are diagrams illustrating a compensation voltage in the case where an offset is 0 in correspondence with first to third voltage codes.

Referring to FIGS. 11A and 11B, in the case where the offset is 0 in each of the first to third voltage codes, it means that the target voltage and the sensing voltage SV are the same as each other. In this case, the compensation LUT maintains the initial reference LUT 1448. Accordingly, the voltage of the first driving power VDD is not changed.

Figure 12A:
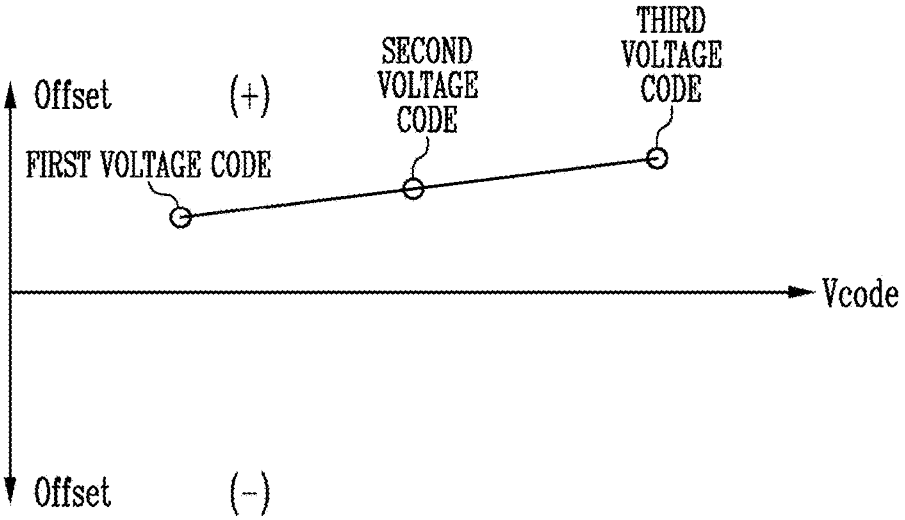
FIGS. 12A and 12B are diagrams illustrating a compensation voltage in the case where an offset is a positive value in correspondence with the first to third voltage codes according to some embodiments of the present disclosure.
Figure 12B:
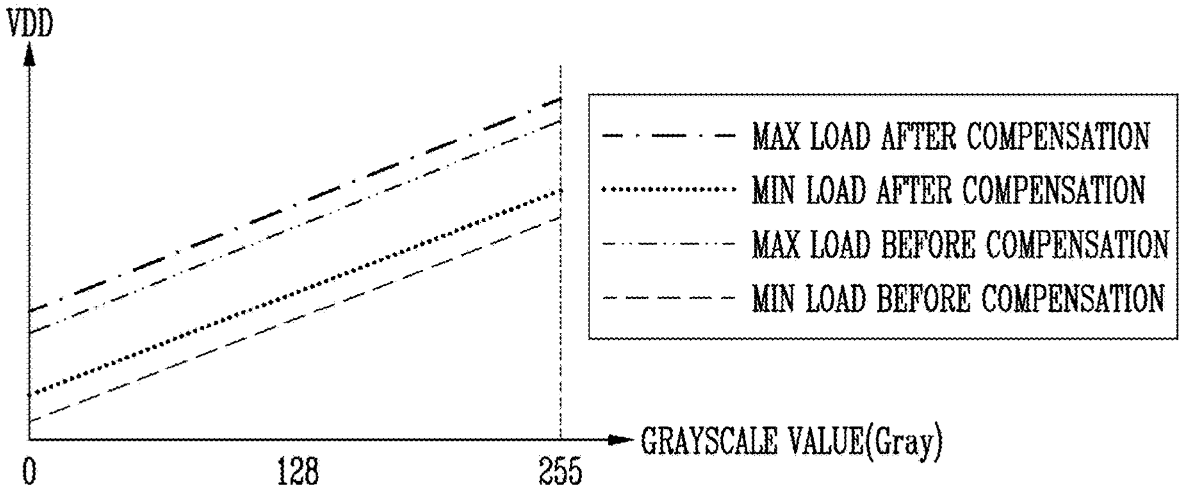

FIGS. 12A and 12B are diagrams illustrating a compensation voltage in the case where the offset is a positive value in correspondence with the first to third voltage codes.

Referring to FIGS. 12A and 12B, in the case where the offset is a positive value in each of the first to third voltage codes, it means that the target voltage is higher than the sensing voltage SV. In this case, the compensation LUT is generated by applying an offset Offset having a positive value. Accordingly, the power generator 150 may generate a relatively high voltage compared to the initial value (or the reference LUT 1448).

Figure 13A:
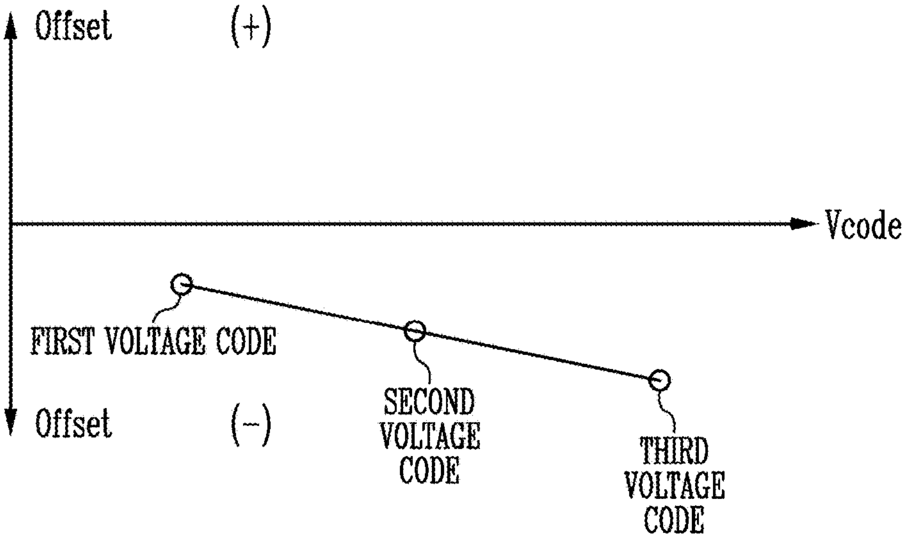
FIGS. 13A and 13B are diagrams illustrating a compensation voltage in the case where an offset is a negative value in correspondence with the first to third voltage codes according to some embodiments of the present disclosure.
Figure 13B:
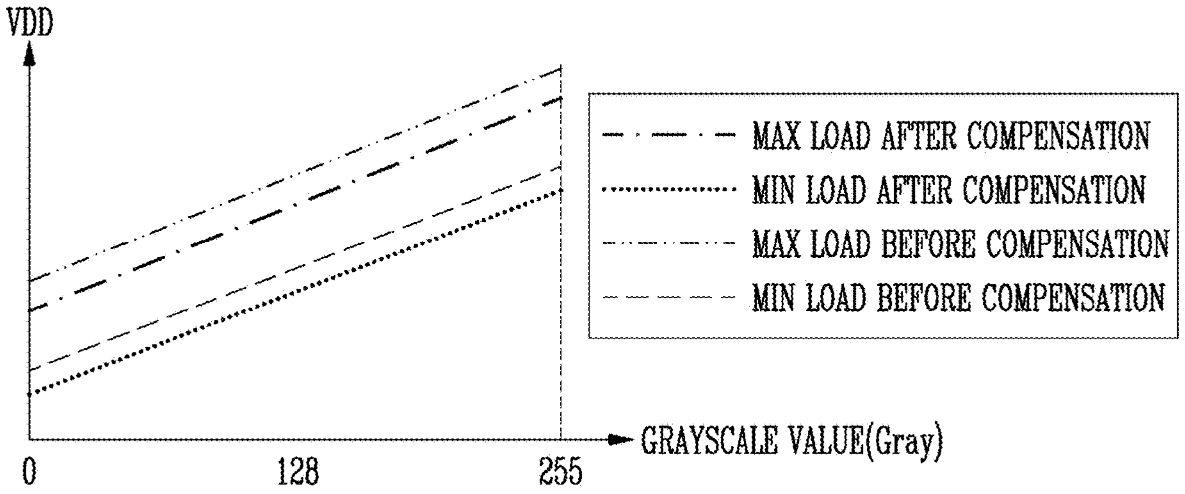

FIGS. 13A and 13B are diagrams illustrating a compensation voltage in the case where an offset is a negative value in correspondence with the first to third voltage codes.

Referring to FIGS. 13A and 13B, in the case where the offset is a negative value in each of the first to third voltage codes, it means that the target voltage is lower than the sensing voltage SV. In this case, the compensation LUT is generated by applying an offset Offset having a negative value. Accordingly, the power generator 150 may generate a relatively low voltage compared to the initial value (or the reference LUT 1448).

Figure 14:
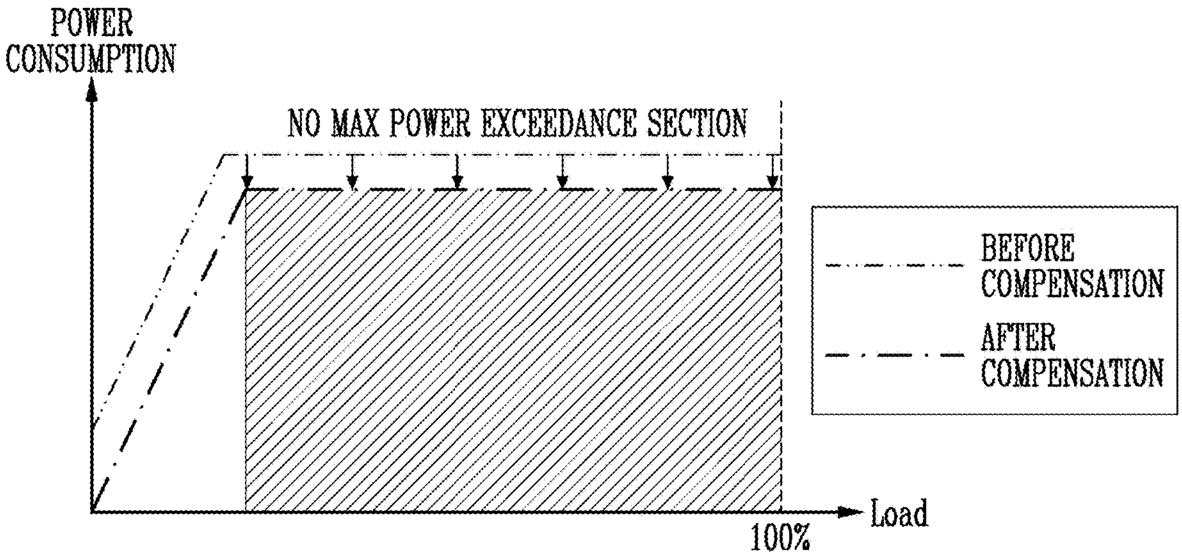
FIG. 14 is a diagram illustrating power consumption as a function of the load of a pixel component according to some embodiments of the present disclosure.

FIG. 14 is a diagram illustrating power consumption as a function of the load of the pixel component according to some embodiments of the present disclosure. In FIG. 14, there is illustrated the case where the initial sensing voltage SV is higher than the target voltage.

Referring to FIG. 14, in the case where the sensing voltage SV is higher than the target voltage, the compensation LUT may be generated by applying a negative value as the offset Offset. Furthermore, the code value generator 148 may generate the voltage code Vcode using the compensation LUT. In this case, the power consumption may correspond to that of the design of the display device 100 (in other words, the power consumption decreases compared to before compensation). Accordingly, the reliability of the operation can be secured.

Figure 15:
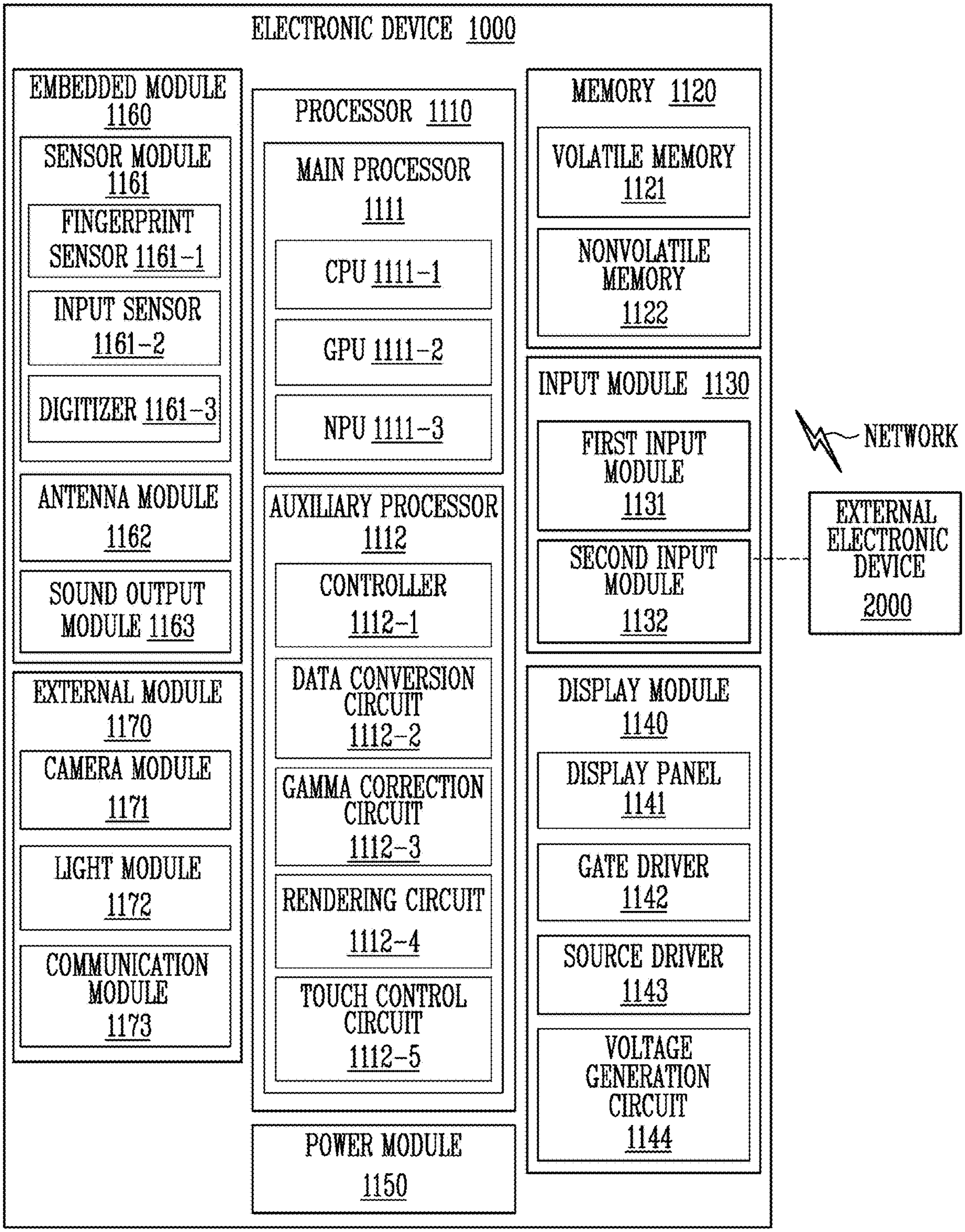
FIG. 15 is a diagram illustrating an electronic device according to some embodiments of the present disclosure.

FIG. 15 is a diagram illustrating an electronic device 1000 according to some embodiments of the present disclosure.

Referring to FIG. 15, the electronic device 1000 according to some embodiments of the present disclosure may output a variety of information through a display module 1140. If a processor 1110 executes an application stored in a memory 1120, the display module 1140 may provide application information to the user through a display panel 1141.

The processor 1110 may acquire an external input through an input module 1130 or a sensor module 1161, and execute an application corresponding to the external input. For example, in the case where the user selects a camera icon (or a camera application icon) displayed on the display panel 1141, the processor 1110 may acquire a user input through an input sensor 1161-2, and activate a camera module 1171. The processor 1110 may transmit image data corresponding to an image captured by the camera module 1171 to the display module 1140. The display module 1140 may display, on the display panel 1141, an image corresponding to the captured image.

As another example, in the case where personal information authentication is executed through the display module 1140, a fingerprint sensor 1161-1 may acquire inputted fingerprint information as input data. The processor 1110 may compare input data acquired through the fingerprint sensor 1161-1 with authentication data stored in the memory 1120, and may execute an application depending on a result of the comparison. The display module 1140 may display, on the display panel 1141, information executed according to the logic of the application. The fingerprint sensor 1161-1 may be arranged to make it possible to acquire fingerprint information in the overall area of the display module 1140 (or the display panel 1141).

As a further example, in the case where a music streaming icon displayed on the display module 1140 is selected, the processor 1110 may acquire a user input through the input sensor 1161-2, and activate a music streaming application stored in the memory 1120. If a music playing command is inputted in the music streaming application, the processor 1110 may activate a sound output module 1163 and provide sound information corresponding to the music playing command to the user.

Hitherto, a brief description of the operation of the electronic device 1000 has been provided. Hereinafter, the configuration of the electronic device 1000 will be described in detail. Some of the components of the electronic device 1000 to be described below may be integrated into a single component, or one component may be separated into two or more components.

The electronic device 1000 may communicate with an external electronic device 2000 through a network (e.g., a short-range wireless communication network or a long-range wireless communication network). According to some embodiments, the electronic device 1000 may include a processor 1110, a memory 1120, an input module 1130, a display module 1140, a power module 1150, an embedded module 1160, and an external mounted module 1170. According to some embodiments, in the electronic device 1000, at least one of the foregoing components may be omitted, or one or more other components may be added. According to some embodiments, some components (e.g., the sensor module 1161, an antenna module 1162, or the sound output module 1163) among the foregoing components may be integrated into another component (e.g., the display module 1140).

The processor 1110 may execute software to control at least one other component (e.g., a hardware or software component) of the electronic device 1000 connected to the processor 1110 and perform various data processing or computing operations. According to some embodiments, as at least a portion of a data processing or computing operation, the processor 1110 may store a command or data received from another component (e.g., the input module 1130, the sensor module 1161, or a communication module 1173) in a volatile memory 1121, process the command or data stored in the volatile memory 1121, and store result data in a nonvolatile memory 1122.

The processor 1110 may include a main processor 1111 and an auxiliary processor 1112. The main processor 1111 may include a central processing unit (CPU) 1111-1. The main processor 1111 may further include any one or more of a graphic processing unit (GPU) 1111-2, a communication processor (CP), and an image signal processor (ISP). The main processor 1111 may further include a neural processing unit (NPU) 1111-3. The NPU 1111-3 may be a processor specialized to process an artificial intelligence model. The artificial intelligence model may be generated by machine learning. The artificial intelligence model may include a plurality of artificial neural network layers. An artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-networks, or a combination of two or more among the foregoing networks, but is not limited thereto. The artificial intelligence model may not only include a hardware structure but may also include an additional or substitutive software structure. At least two of the foregoing processing units and the processors may be implemented as a single integrated component (e.g., a single chip). Alternatively, the processing units and the processors may be implemented as respective independent components (e.g., a plurality of chips).

The auxiliary processor 1112 may include a controller 1112-1. The controller 1112-1 may include an interface conversion circuit and a timing control circuit. For example, the controller 1112-1 may include the timing controller 140 shown in FIGS. 1 and 6. The controller 1112-1 may receive an image signal from the main processor 1111, and may convert a data format of the image signal to a format corresponding to specifications of an interface with the display module 1140 and output image data. The controller 1112-1 may output various control signals needed to drive the display module 1140.

The controller 1112-1 may generate a compensation LUT using the compensation LUT generator 1446 during the correction period. To this end, the controller 1112-1 may include a sensing controller 142, a voltage adjuster 144, an analyzer 146, and a code value generator 148.

The auxiliary processor 1112 may further include a data conversion circuit 1112-2, a gamma correction circuit 1112-3, a rendering circuit 1112-4, a touch control circuit 1112-5, etc. The data conversion circuit 1112-2 may receive image data from the controller 1112-1, compensate for the image data to display an image at a desired luminance based on characteristics of the electronic device 1000 or settings of the user, or may convert the image data to reduce power consumption or compensate for afterimages.

The gamma correction circuit 1112-3 may convert image data, a gamma reference voltage, or the like so that an image to be displayed on the electronic device 1000 can have desired gamma characteristics. The rendering circuit 1112-4 may receive image data from the controller 1112-1, and render the image data taking into account pixel arrangement or the like on the display panel 1141 applied to the electronic device 1000.

The touch control circuit 1112-5 may supply a touch signal to the input sensor 1161-2, and receive a sensing signal from the input sensor 1161-2 in response to the touch signal.

At least one of the data conversion circuit 1112-2, the gamma correction circuit 1112-3, the rendering circuit 1112-

4, or the touch control circuit 1112-5 may be integrated into another component (e.g., the main processor 1111 or the controller 1112-1). At least one among the data conversion circuit 1112-2, the gamma correction circuit 1112-3, and the rendering circuit 1112-4 may be integrated into a source driver 1143 to be described below.

The memory 1120 may store a variety of data to be used in at least one component (e.g., the processor 1110 or the sensor module 1161) of the electronic device 1000, and input data or output data for a command pertaining to the data. Furthermore, the memory 1120 may store a variety of setting data corresponding to settings of the user. Furthermore, the target LUT 1442, the reference LUT 1448, and the compensation LUT illustrated in FIG. 6 may be stored in the memory 1120. Alternatively, the target LUT 1442, the reference LUT 1448, and the compensation LUT may be stored in an internal memory of the controller 1112-1. The memory 1120 may include at least one or more of the volatile memory 1121 and the nonvolatile memory 1122.

The input module 1130 may receive a command or data to be used in a component (e.g., the processor 1110, the sensor module 1161, or the sound output module 1163) of the electronic device 1000 from an external device (e.g., the user or an external electronic device 2000) provided outside the electronic device 1000.

The input module 1130 may include a first input module 1131 configured to receive a command or data from the user, and a second input module 1132 configured to receive a command or data from the external electronic device 2000. The first input module 1131 may include a microphone, a mouse, a keyboard, a key (e.g., a button), or a pen (e.g., a passive pen or an active pen). The second input module 1132 may support a designated protocol, which can be connected to the external electronic device 2000 in a wired or wireless manner. According to some embodiments, the second input module 1132 may include a high definition multimedia interface (HDMI), a universal serial bus (USB) interface, an SD card interface, or an audio interface. The second input module 1132 may include a connector, e.g., an HDMI connector, a USB connector, an SD card connector, or an audio connector (e.g., a headphone connector), for physical connection with the external electronic device 2000.

The display module 1140 may provide visual information to the user. The display module 1140 may include a display panel 1141, a gate driver 1142, a source driver 1143, and a voltage generation circuit 1144. The display module 1140 may further include a window, a chassis, and a bracket to protect the display panel 1141. The display module 1140 may include at least some components of the display device 100 illustrated in FIG. 1.

The display panel 1141 (or a display) may include a liquid crystal display panel, an organic light emitting display panel, or an inorganic light emitting display panel. The type of display panel 1141 is not limited to a particular type. The display panel 1141 is a rigid type panel, or a flexible type panel, which is rollable or foldable. The display module 1140 may further include a support, a bracket, or a heat dissipater, which supports the display panel 1141. The display panel 1141 may include the pixel component 110 illustrated in FIG. 1.

The gate driver 1142 may be mounted on the display panel 1141 as a driving chip. The gate driver 1142 may be integrated on the display panel 1141. For example, the gate driver 1142 may include an amorphous silicon TFT gate (ASG) driver circuit, a low temperature polycrystalline silicon (LTPS) TFT gate driver circuit, or an oxide semiconductor TFT gate (OSG) driver circuit, which is internalized in the display panel 1141. The gate driver 1142 may receive a control signal from the controller 1112-1, and output scan signals to the display panel 1141 in response to the control signal. The gate driver 1142 may include the scan driver 120 illustrated in FIG. 1.

The display module 1140 may further include an emission driver. The emission driver may output an emission control signal to the display panel 1141 in response to a control signal received from the controller 1112-1. The emission driver may be formed separately from the gate driver 1142, or may be integrated into the gate driver 1142.

The source driver 1143 may receive a control signal from the controller 1112-1, convert image data to an analog voltage (e.g., a data signal) in response to the control signal, and output data signals to the display panel 1141. The source driver 1143 may include the data driver 130 illustrated in FIG. 1.

The source driver 1143 may be integrated into another component (e.g., the controller 1112-1). The functions of the interface conversion circuit and the timing control circuit of the controller 1112-1 may be integrated into the source driver 1143. In addition, the display module 1140 may further include the voltage/current sensing component 160 illustrated in FIG. 1.

The voltage generation circuit 1144 may output various voltages needed to drive the display panel 1141. For example, the voltage generation circuit 1144 may include the power generator 150 illustrated in FIG. 1. The voltage generation circuit 1144 may include the DAC 152 and the DC-DC converter 154 illustrated in FIG. 6. According to some embodiments, the display panel 1141 may include the pixels PX illustrated in FIG. 1.

According to some embodiments, the source driver 1143 may convert data that is included in image data received from the processor 1110 and corresponds to red (R), green (G), and blue (B) to a red data signal (or a data voltage), a green data signal, and a blue data signal, and provide the data signals to a plurality of pixel columns included in the display panel 1141 during a single horizontal period.

The power module 1150 may supply power to the components of the electronic device 1000. The power module 1150 may include a battery to store power voltage. The battery may include a primary cell, which cannot be recharged, and a secondary cell or a fuel cell, which are rechargeable. The power module 1150 may include a power management integrated circuit (PMIC). The PMIC may supply optimized power to each of the foregoing modules and modules to be described below. The power module 1150 may include a wireless power transceiver that is electrically connected with the battery. The wireless power transceiver may include a plurality of coiled antenna radiators. According to some embodiments, the power module 1150 and at least some components of the voltage generation circuit 1144 may be integrated into a single component. For example, the voltage generation circuit 1144 may be included in the power module 1150.

The electronic device 1000 may further include an embedded module 1160 and an external mounted module 1170. The embedded module 1160 may include a sensor module 1161, an antenna module 1162, and a sound output module 1163. The external mounted module 1170 may include a camera module 1171, a light module 1172, and a communication module 1173.

The sensor module 1161 may sense an input from the body of the user or an input from a pen of the first input module 1131, and generate an electric signal or a data value corresponding to the input. The sensor module 1161 may include at least one or more among a fingerprint sensor 1161-1, an input sensor 1161-2, and a digitizer 1161-3.

The fingerprint sensor 1161-1 may generate a data value corresponding to the fingerprint of the user.

The input sensor 1161-2 may generate a data value corresponding to coordinate information of the input from the body of the user or the input from the pen. The input sensor 1161-2 may generate a data value corresponding to the amount of change in capacitance by the input. The input sensor 1161-2 may sense an input from a passive pen, or transmit or receive data to or from an active pen.

The input sensor 1161-2 may measure a biometric signal pertaining to biometric information such as a blood pressure, body fluid, or body fat. For example, in the case where the user brings a part of his/her body into contact with the sensor layer or the sensing panel and remains stationary for a certain time, the input sensor 1161-2 may sense a biometric signal, based on a change in electric field by the part of his/her body, and output information desired by the user to the display module 1140.

The digitizer 1161-3 may generate a data value corresponding to coordinate information of an input from a pen. The digitizer 1161-3 may generate data values corresponding to electromagnetic variations caused by the input. The digitizer 1161-3 may sense an input from a passive pen, or transmit or receive data to or from an active pen.

At least one of the fingerprint sensor 1161-1, the input sensor 1161-2, or the digitizer 1161-3 may be implemented as a sensor layer formed on the display panel 1141 through a successive process. At least one among the fingerprint sensor 1161-1, the input sensor 1161-2, and the digitizer 1161-3 may be arranged over the display panel 1141. Any one among the fingerprint sensor 1161-1, the input sensor 1161-2, and the digitizer 1161-3, for example, the digitizer 1161-3, may be arranged under the display panel 1141.

At least two or more among the fingerprint sensor 1161-1, the input sensor 1161-2, and the digitizer 1161-3 may be formed to be integrated into a single sensing panel through the same process. In the case where at least two or more among the fingerprint sensor 161-1, the input sensor 161-2, and the digitizer 161-3 are integrated into a single sensing panel, the sensing panel may be located between the display panel 1141 and a window arranged over the display panel 1141. According to some embodiments, the sensing panel may be located on the window, and the position of the sensing panel is not particularly limited.

At least one of the fingerprint sensor 1161-1, the input sensor 1161-2, or the digitizer 1161-3 may be embedded in the display panel 1141. In other words, during a process of forming components (e.g., a light emitting element, a transistor, and the like) included in the display panel 1141, at least one among the fingerprint sensor 1161-1, the input sensor 1161-2, and the digitizer 1161-3 may be formed simultaneously with the components.

In addition, the sensor module 1161 may generate an electrical signal or data value corresponding to internal conditions or external conditions of the electronic device 1000. The sensor module 1161 may further include, for example, a gesture sensor, a gyroscope sensor, an atmospheric sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas to transmit or receive a signal or power to or from an external device. According to some embodiments, the communication module 1173 may transmit a signal to an external electronic device or receive a signal from the external electronic device through an antenna suitable for a communication scheme. An antenna pattern of the antenna module 1162 may be integrated to a component of the display module 1140 (e.g., the display panel 1141 of the display module 1140) or the input sensor 1161-2.

The sound output module 1163 may be a device for outputting a sound signal to a device provided outside the electronic device 1000, and, for example, may include a speaker, which is used for typical purposes such as reproducing multimedia or record data, and a receiver, which is used only for phone reception. According to some embodiments, the receiver may be integrally or separately formed with a speaker. A sound output pattern of the sound output module 1163 may be integrated into the display module 1140.

The camera module 1171 may capture a static image or a video. According to some embodiments, the camera module 1171 may include one or more lenses, an image sensor, or an image signal processor. The camera module 1171 may further include an infrared camera capable of sensing the presence of the user, the position of the user, a line of sight of the user, etc.

The light module 1172 may provide light. The light module 1172 may include a light emitting diode or a xenon lamp. The light module 1172 may be operated interlocking with the camera module 1171 or operated independently therefrom.

The communication module 1173 may form a wire or wireless communication channel between the electronic device 1000 and the external electronic device 2000, and support execution of communication through the formed communication channel. The communication module 1173 may include either or both a wireless communication module such as a cellular communication module, a short-range wireless communication module, or a global navigation satellite system (GNSS) communication module, and a wire communication module such as a local area network (LAN) communication module, or a power line communication module. The communication module 1173 may communicate with the external electronic device 2000 through a short-range communication network such as Bluetooth, WiFi Direct or infrared data association (IrDA), or a long-range communication network such as a cellular network, an internet, or a computer network (e.g., LAN or WAN). The various types of communication modules 1173 described above may be implemented as a single chip or may be implemented as respective separate chips.

The input module 1130, the sensor module 1161, the camera module 1171, and the like, interlocking with the processor 1110, may be used to control the operation of the display module 1140

The processor 1110 may output a command or data to the display module 1140, the sound output module 1163, the camera module 1171, or the light module 1172, based on input data received from the input module 1130. For example, the processor 1110 may generate image data in response to input data applied through a mouse, an active pen, or the like and output the image data to the display module 1140, or may generate command data in response to input data and output the command data to the camera module 1171 or the light module 1172. In the case where input data is not received from the input module 1130, the processor 1110 may convert the operation mode of the electronic device 1000 to a low-power mode or a sleep mode, thus reducing the power consumption of the electronic device 1000.

The processor 1110 may output a command or data to the display module 1140, the sound output module 1163, the camera module 1171, or the light module 1172, based on sensing data received from the sensor module 1161. For example, the processor 1110 may compare authentication data applied from the fingerprint sensor 1161-1 with the authentication data stored in the memory 1120, and may execute an application depending on a result of the comparison. The processor 1110 may execute a command based on sensing data sensed by the input sensor 1161-2 or the digitizer 1161-3, or output corresponding image data to the display module 1140. In the case where the sensor module 1161 includes a temperature sensor, the processor 1110 may receive temperature data for a measured temperature from the sensor module 1161, and further execute a luminance correction operation for the image data based on the temperature data.

The processor 1110 may receive measurement data for the presence of the user, the position of the user, a line of sight of the user, or the like from the camera module 1171. The processor 1110 may further execute a luminance correction operation for the image data based on the measurement data. For example, the processor 1110 that has determined whether the user is present through an input from the camera module 1171 may output, to the display module 1140, image data the luminance of which is corrected by the data conversion circuit 1112-2 or the gamma correction circuit 1112-3.

Some components among the foregoing components may be connected to each other by a communication scheme, e.g., a bus, general purpose input/output (GPIO), a serial peripheral interface (SPI), a mobile industry processor interface (MIPI), or a ultra path interconnect (UPI) link, which can be used between peripheral devices, and may thus exchange a signal (e.g., a command or data) therebetween. The processor 1110 may communicate with the display module 1140 through a predefined interface. For example, any one of the foregoing communication schemes may be used, and the interface is not limited to the foregoing communication schemes.

In a display device, a method of driving the display device, and an electronic device including the display device in accordance with embodiments of the present disclosure, first driving power may be set to a target voltage regardless of the tolerance of circuits. Accordingly, the reliability of the operation can be secured.

However, effects of the present disclosure are not limited to the above-described effects, and various modifications are possible without departing from the spirit and scope of the present disclosure.

While embodiments of the present disclosure have been described above, those skilled in the art will appreciate that various modifications, additions and substitutions are possible, without departing from the scope and spirit of the present disclosure claimed in the appended claims, and their equivalents.

What is claimed is:

1. A display device, comprising:

a pixel component including pixels connected to a first power line, a second power line, scan lines, and data lines;

a sensing resistor between the first power line and the pixel component;

a voltage/current sensing component configured to measure a sensing voltage from the sensing resistor during a correction period in response to a sensing control signal, wherein the correction period is positioned at a time point at which power is supplied to the display device after a usage time of the display device exceeds a preset threshold value;

a timing controller configured to generate a voltage code based on pieces of input data; and a power generator configured to supply a voltage of first driving power to the first power line in response to the voltage code, wherein the timing controller is configured to generate, during the correction period, a compensation look-up table (LUT) such that a target voltage corresponding to the voltage code matches with the sensing voltage.

2. The display device according to claim 1, wherein the timing controller is configured to generate the compensation LUT in response to a first voltage code of a minimum load, a second voltage code of an intermediate load, and a third voltage code of a maximum load.

3. The display device according to claim 2, wherein the timing controller is configured to generate the compensation LUT corresponding to remaining loads and remaining voltage codes by interpolating the first voltage code, the second voltage code, and the third voltage code.

4. The display device according to claim 2, wherein the first voltage code corresponds to a minimum grayscale value, the second voltage code corresponds to an intermediate grayscale value, and the third voltage code corresponds to a maximum grayscale value.

5. The display device according to claim 1, wherein the voltage/current sensing component is configured to measure sensing current from the sensing resistor during a period other than the correction period.

6. The display device according to claim 1, wherein the power generator comprises:

an analog-digital converter configured to generate a reference voltage using the voltage code; and a DC-DC converter configured to generate the first driving power based on the reference voltage.

7. The display device according to claim 1, wherein the timing controller comprises:

an analyzer configured to calculate a load from the pieces of input data, and extract a peak grayscale value;

a code value generator configured to generate the voltage code corresponding to the load and the peak grayscale value; and a voltage adjuster configured to generate the compensation LUT using an offset corresponding to a difference between the sensing voltage and the target voltage.

8. The display device according to claim 7, wherein the timing controller further comprises a sensing controller configured to control the voltage/current sensing component to measure the sensing voltage during the correction period, and control the voltage/current sensing component to measure sensing current during a period other than the correction period.

9. The display device according to claim 7, wherein the analyzer comprises:

a load analyzer configured to calculate a load from the pieces of input data; and a grayscale analyzer configured to extract the peak grayscale value from the pieces of input data.

10. The display device according to claim 7, wherein the voltage adjuster comprises:

a voltage error determination component configured to extract a target voltage corresponding to the voltage code from a target LUT, and generate an offset corresponding to a difference between the sensing voltage and the target voltage; and a compensation LUT generator configured to generate the compensation LUT by applying the offset to a reference LUT in which the target voltage corresponding to the voltage code is stored.

11. The display device according to claim 10, wherein the target LUT is an LUT identical to the reference LUT.

12. The display device according to claim 10, wherein the voltage error determination component is configured to generate an offset of a negative value in a case where the sensing voltage is higher than the target voltage, and to generate an offset of a positive value in a case where the sensing voltage is lower than the target voltage.

13. The display device according to claim 10, wherein the voltage error determination component is configured to generate a value of "0" as the offset in a case where the sensing voltage is identical to the target voltage.

14. The display device according to claim 10, wherein the code value generator is configured to generate the voltage code using the compensation LUT during a period other than the correction period.

15. A method of driving a display device, the method comprising:

generating a voltage of first driving power corresponding to a voltage code during a correction period in response to a sensing control signal, wherein the correction period is positioned at a time point at which power is supplied to the display device after a usage time of the display device exceeds a preset threshold value;

measuring the voltage of the first driving power and generating a sensing voltage;

comparing the sensing voltage with a target voltage corresponding to the voltage code, and generating an offset; and generating a compensation look-up table (LUT) using the offset.

16. The method according to claim 15, wherein the offset is generated such that the sensing voltage is identical to the target voltage.

17. The method according to claim 15, wherein the voltage code is generated using the compensation LUT during a period other than the correction period.

18. The method according to claim 15, wherein generating the compensation LUT comprises generating the compensation LUT in response to a first voltage code of a minimum load, a second voltage code of an intermediate load, and a third voltage code of a maximum load during the correction period.

19. The method according to claim 18, further comprising generating the compensation LUT corresponding to remaining loads and remaining codes by interpolating the first voltage code, the second voltage code, and the third voltage code.

20. The method according to claim 18, wherein the first voltage code corresponds to a minimum grayscale value, the second voltage code corresponds to an intermediate grayscale value, and the third voltage code corresponds to a maximum grayscale value.

21. The method according to claim 15, wherein generating the offset comprises generating an offset of a negative value in a case where the sensing voltage is higher than the target voltage, and generating an offset of a positive value in a case where the sensing voltage is lower than the target voltage.

22. An electronic device comprising:

a display panel including pixels;

a voltage generation circuit configured to supply a voltage of first driving power to the display panel based on a voltage code;

a current/voltage sensing component configured to measure, during a correction period in response to a sensing control signal, the voltage of the first driving power supplied to the display panel and to generate a sensing voltage, wherein the correction period is positioned at a time point at which power is supplied to the dislay panel after a usage time of the display panel exceeds a preset threshold value; and a controller configured to generate the voltage code based on pieces of input data, wherein the controller is configured to generate, during the correction period, a compensation LUT such that a target voltage corresponding to the voltage code matches with the sensing voltage.

23. The electronic device according to claim 22, wherein the controller is configured to generate the compensation LUT in response to a first voltage code of a minimum load, a second voltage code of an intermediate load, and a third voltage code of a maximum load, and wherein the controller is configured to generate the compensation LUT corresponding to remaining loads and remaining voltage codes by interpolating the first voltage code, the second voltage code, and the third voltage code.

24. The electronic device according to claim 22, wherein the controller is configured to generate the voltage code using the compensation LUT during a period other than the correction period.

* * * * *